(12) United States Patent
Taghavi et al.

(10) Patent No.: US 12,474,231 B2
(45) Date of Patent: Nov. 18, 2025

(54) AUTONOMOUS ELECTRO-OPTICAL SYSTEM TO MONITOR IN REAL-TIME THE FULL SPATIAL MOTION (ROTATION AND DISPLACEMENT) OF CIVIL STRUCTURES

(71) Applicant: California Institute of Technology, Pasadena, CA (US)

(72) Inventors: Shervin Larigani Taghavi, Woodland Hills, CA (US); Thomas H. Heaton, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/359,754

(22) Filed: Mar. 20, 2019

(65) Prior Publication Data

US 2019/0293518 A1    Sep. 26, 2019

Related U.S. Application Data

(60) Provisional application No. 62/782,506, filed on Dec. 20, 2018, provisional application No. 62/645,397, filed on Mar. 20, 2018.

(51) Int. Cl.
| | |
|---|---|
| *G01M 5/00* | (2006.01) |
| *G06T 3/4015* | (2024.01) |
| *G06T 7/11* | (2017.01) |
| *G06T 7/215* | (2017.01) |

(52) U.S. Cl.
CPC .......... *G01M 5/0008* (2013.01); *G01M 5/005* (2013.01); *G06T 3/4015* (2013.01); *G06T 7/11* (2017.01); *G06T 7/215* (2017.01)

(58) Field of Classification Search
CPC .................. G06T 2207/10024; G06T 5/002
See application file for complete search history.

(56) References Cited

U.S. PATENT DOCUMENTS

| | | | |
|---|---|---|---|
| 10,846,960 B1 | 11/2020 | Lemberger et al. | |
| 2006/0062557 A1* | 3/2006 | Imada ................ | H04N 5/23209 396/55 |
| 2006/0082590 A1* | 4/2006 | Stevick .................. | A61B 5/113 345/587 |
| 2012/0044372 A1* | 2/2012 | Cote .................... | H04N 5/2258 348/222.1 |
| 2013/0322753 A1* | 12/2013 | Lim ......................... | G06T 5/50 382/167 |

(Continued)

FOREIGN PATENT DOCUMENTS

| | | |
|---|---|---|
| CN | 109635386 A | 4/2019 |
| CN | 109870223 A | 6/2019 |

(Continued)

OTHER PUBLICATIONS

Larigani, Shervin & Heaton, Thomas. (2016). Characterizing Deformation of Buildings from Videos. (Year: 2016).*

(Continued)

*Primary Examiner* — Ross Varndell
(74) *Attorney, Agent, or Firm* — GATES & COOPER LLP

(57) ABSTRACT

An electro-optical device capable of identifying a target in the time series of the images so as to measure motion of a civil structure, such as a bridge, in response to forces (such as the weight of a vehicle traversing the bridge).

22 Claims, 16 Drawing Sheets

(56) References Cited

U.S. PATENT DOCUMENTS

| | | | | |
|---|---|---|---|---|
| 2014/0132965 | A1* | 5/2014 | Chang | G01B 11/02 356/634 |
| 2015/0218872 | A1 | 8/2015 | Breed | |
| 2016/0188994 | A1* | 6/2016 | Wu | G06T 7/593 382/195 |
| 2018/0003499 | A1* | 1/2018 | Locatelli | G01C 15/006 |
| 2018/0209883 | A1* | 7/2018 | Imagawa | G01N 3/068 |
| 2018/0255244 | A1* | 9/2018 | Petty | H04N 21/2747 |
| 2018/0300556 | A1* | 10/2018 | Varerkar | G06N 3/0445 |
| 2019/0387152 | A1* | 12/2019 | Sivan | G06F 1/163 |
| 2020/0073545 | A1* | 3/2020 | Hay | A61B 5/4815 |

FOREIGN PATENT DOCUMENTS

| | | | | |
|---|---|---|---|---|
| CN | 109916491 | A | | 6/2019 |
| CN | 109870223 | B | | 11/2021 |
| CN | 112710371 | B | | 12/2021 |
| KR | 20170066742 | A | * 6/2017 | G01G 19/03 |
| WO | 2020/146844 | | | 1/2020 |

OTHER PUBLICATIONS

S. N. Yaryshev, L. Li, M. B. Marinov and T. S. Djamiykov, "Development of a Digital Camera-Based Method for Bridge Deformation Measurement," 2020 XXIX International Scientific Conference Electronics (ET), Sozopol, Bulgaria, 2020, pp. 1-4, doi: 10.1109/ET50336.2020.9238322. (Year: 2020).*

H. S. Park, K. Park, Y. Kim and S. W. Choi, "Deformation Monitoring of a Building Structure Using a Motion Capture System," in IEEE/ASME Transactions on Mechatronics, vol. 20, No. 5, pp. 2276-2284, Oct. 2015, doi: 10.1109/TMECH.2014.2374219. (Year: 2015).*

Myung, Hyun & Lee, Seungmok & Lee, Bum-Joo. (2009). Structural health monitoring robot using paired structured light. 10.1109/ISIE.2009.5214728. (Year: 2009).*

Zhao X, Liu H, Yu Y, et al. Bridge displacement monitoring method based on laser projection-sensing technology. Sensors (Basel). 2015;15(4):8444-8463. Published Apr. 13, 2015. doi:10.3390/s150408444 (Year: 2015).*

Xu, Y., Brownjohn, J.M.W. Review of machine-vision based methodologies for displacement measurement in civil structures. J Civil Struct Health Monit 8, 91-110. https://doi.org/10.1007/s13349-017-0261-4 (Year: 2018).*

Xu et al., "Review of machine-vision based methodologies for displacement measurement in civil structures." (Year: 2017).*

Ojio, T., Carey, C., OBrien, E., Doherty, C., and Taylor, S. "Contactless Bridge Weighin-Motion." Journal of Bridge Engineering, 10.1061/(ASCE)BE.1943-5592.0000776 , 04016032. (Year: 2016).*

Taghavi, S.and T. H. Heaton, "Characterizing Deformation of Buildings from Videos. Submitted, California Institute of Technology," https://authors.library.caltech.edu/records/f3a20-t7d53. (Year: 2016).*

Wimsett, S., "Standard Specification for Highway Weigh-In-Motion (WIM) Systems with User Requirements and Test Methods", ASTM International, 2017, pp. 1-18.

Bushman, R., et al., "Weigh In Motion Technology—Economics and Performance", North American Travel Monitoring Exhibition and Conference, 1998, pp. 1-7.

Canon Online Store, https://shop.usa.canon.com/shop/en/catalog, as downloaded Sep. 24, 2019, pp. 1-4.

Blackmagic Micro Studio Camera 4K | Blackmagic Design, https://www.blackmagicdesign.com/products/blackmagicmicrostudiocamera4k, as downloaded Sep. 24, 2019, pp. 1-20.

PCT International Search Report & Written Opinion dated Jul. 7, 2023 for PCT Application No. PCT/US23/61291.

* cited by examiner

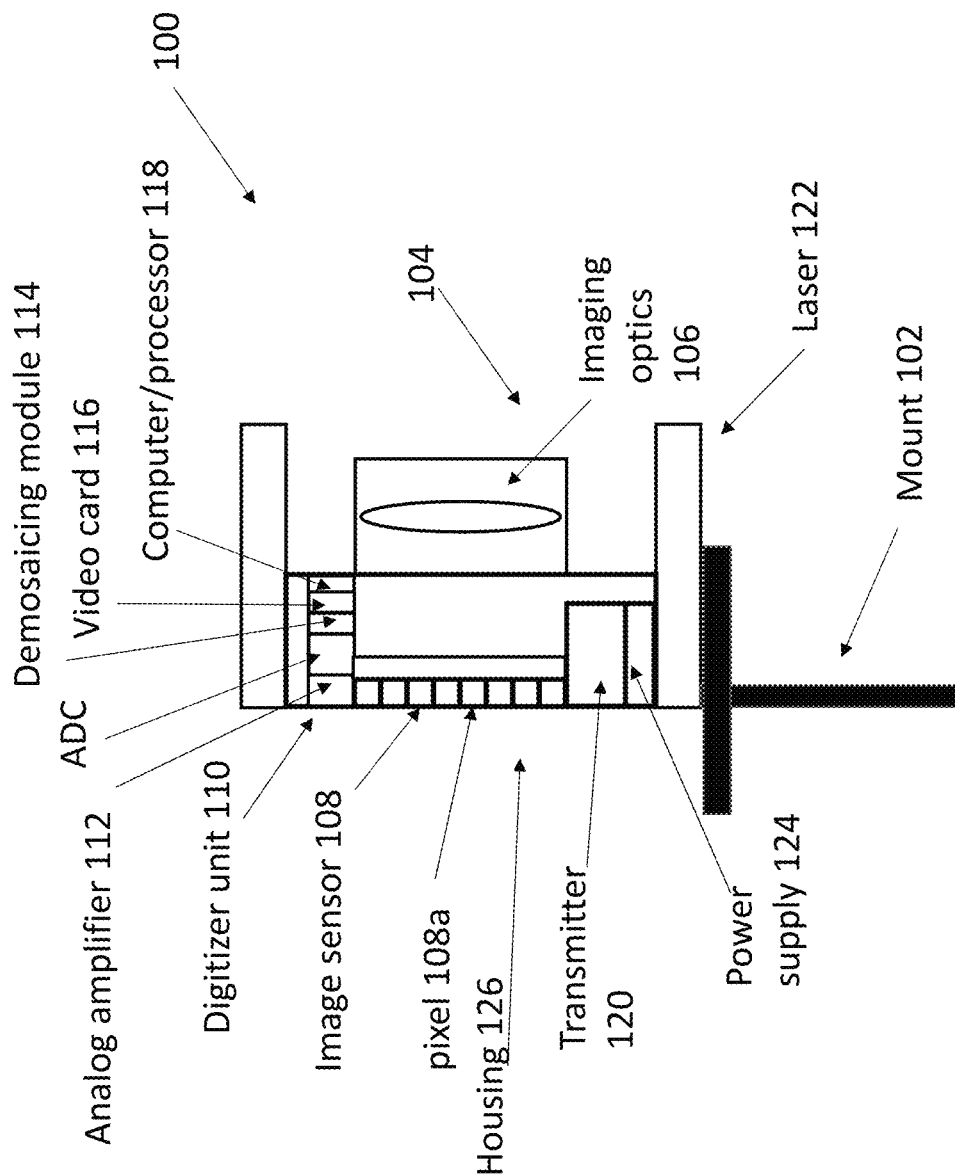

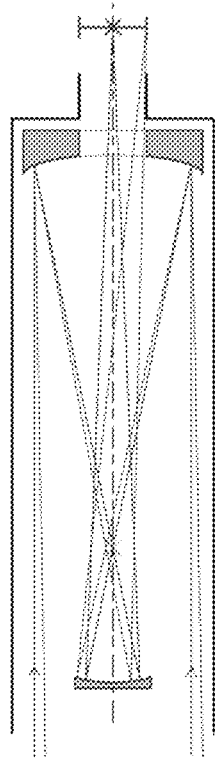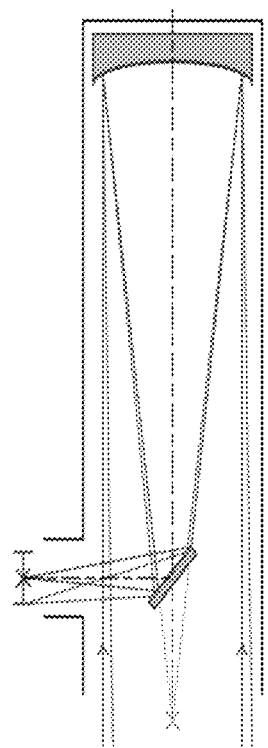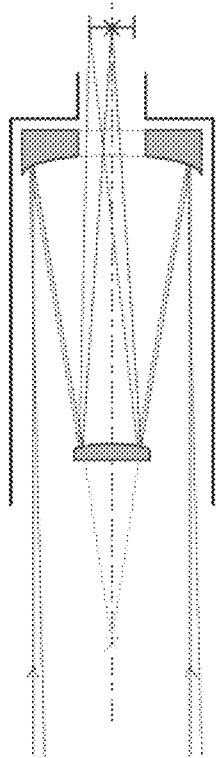
FIG. 1B
FIG. 1C
FIG. 1D (c). Short span, stiff, concrete road bridge on the interstate 5, San Clemente, Ca, https://goo.gl/SRVovM (b) short span, stiff, steel bridge in Arcadia, Ca, https://goo.gl/Wga4u (a)Long, flexible, suspension bridge, Vincent Thomas Bridge, Los Angeles, https://goo.gl/5N3Q2c

AUTONOMOUS ELECTRO-OPTICAL SYSTEM TO MONITOR IN REAL-TIME THE FULL SPATIAL MOTION (ROTATION AND DISPLACEMENT) OF CIVIL STRUCTURES

CROSS REFERENCE TO RELATED APPLICATIONS

This application claims the benefit under 35 U.S.C. Section 119(e) of the following and commonly-assigned U.S. Provisional Patent Applications:

U.S. Provisional Patent Applications Ser. No. 62/645,397 filed on Mar. 20, 2018, entitled "NEW AUTONOMOUS ELECTRO-OPTICAL SYSTEM TO MONITOR IN REAL-TIME THE FULL SPATIAL MOTION (ROTATION AND DISPLACEMENT) OF CIVIL STRUCTURES," by Shervin Larigani Taghavi and Thomas H. Heaton, (CIT-7972-P1); and U.S. Provisional Patent Applications Ser. No. 62/782,506 filed on Dec. 20, 2018, entitled "NEW AUTONOMOUS ELECTRO-OPTICAL SYSTEM TO MONITOR IN REAL-TIME THE FULL SPATIAL MOTION (ROTATION AND DISPLACEMENT) OF CIVIL STRUCTURES," by Shervin Larigani Taghavi and Thomas H. Heaton, (CIT-7972-P2); and which applications are incorporated by reference herein.

BACKGROUND OF THE INVENTION

1. Field of the Invention

This invention relates to a method and system for measuring displacements of civil structures.

2. Description of the Related Art (Note: This application references a number of different publications or references as indicated throughout the specification by one or more reference numbers in brackets [x]. A list of these different publications or references ordered according to these reference numbers can be found below in the section entitled "References." Each of these publications or references is incorporated by reference herein.)

Although weight limits vary by state, federal law dictates trucks must weigh below 80,000 pounds on the interstate highway system. If a truck is heavier than the restrictions for the road on which it is traveling, it can cause damage over time. The weight limit is usually decided on by several factors including the weight limit of the weakest structural section of that road. Weaker spots could be bridges or overpasses, so while the roads can handle more weight, the bridge weight capacity may vary. Structural road safety is not the only cause for weighing trucks, but also vehicular safety. Cargo trucks are required by state and federal laws to maintain a load that is within the specified capacities of the truck they are operating. If the truck is overweight, it presents a danger to both the operator and the other drivers on the road. If a truck has too much weight, it cannot maneuver quickly, is difficult to control going downhill, and needs much more space to come to a complete stop. Another reason trucks must be weighed is to calculate taxes on the truck. Carriers pay thousands of dollars in taxes to put that much stress on the roads, and it is calculated by their load weight. These taxes help maintain the roads and bridges but are much less than the damages the overweight vehicles induce.

Commercial vehicle code enforcement units inside state and municipal police departments are responsible for enforcing legislated weight limits but only account for a few percent of their respective agencies budgets. Moreover, weigh stations cost from several million to hundreds of millions of dollars, their locations are known to truckers, and they interfere with the traffic flow. Weighing trucks while in motion has emerged as a solution so as not bring a vehicle to a stop in order to weigh it. However, Weigh-In-Motion systems have never been able to reach their expectations on account of technical challenges. What is needed then, is a system that can efficiently and non-invasively measure the weight of vehicles traveling on roads and bridges. The present disclosure satisfies this need.

BRIEF DESCRIPTION OF THE DRAWINGS

Referring now to the drawings in which like reference numbers represent corresponding parts throughout:

FIG. 1A illustrates an electro-optic device according to embodiments described herein.

FIG. 1B-1D illustrates imaging optics including a Gregorian telescope (FIG. 1B), a newtonian telescope (FIG. 1C); and a Cassegrain telescrope (FIG. 1D).

FIG. 5. The truck has not yet arrived in the field of view of the camera. The visual-target is not moving much. FIG. 6. The truck deflects the visual-target as it is traversing the field of view of the camera. FIG. 7. The visual target returns back to its initial position as the truck is moving away from the field of the view of the camera. On each image: the lower left graph is the vertical displacement of the bridge; the upper left image is an magnification of the section of the image that contains the visual target; the right side image is the field of view of the camera.

10A is a suspension bridge, FIG. 10B is a short span steel bridge, and FIG. 10C is a short span road bridge on an interstate.

SUMMARY OF THE INVENTION

Figure 2A:
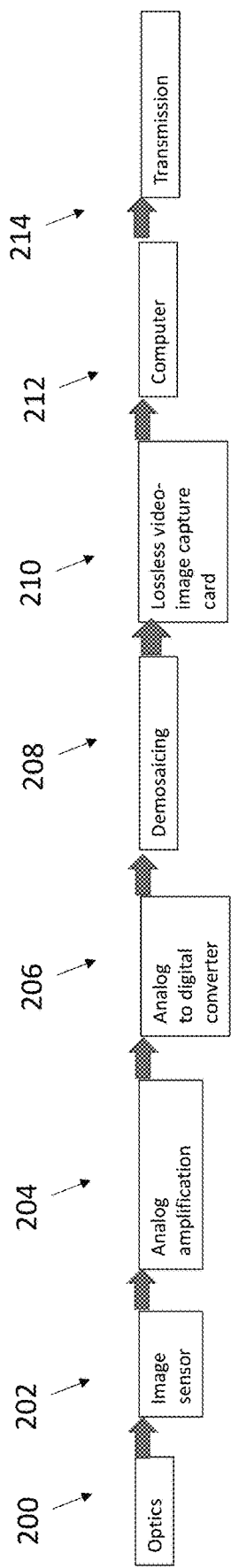
FIG. 2A illustrates an exemplary process flow according to one or more embodiments.

The displacement of a civil structure as a function of time in response to live-loads with a sub-mm resolution is the basis of the dynamic structural analysis of the structure. This information is typically derived indirectly and from the measurement of other variables such as acceleration or strain. Instrumenting the structure with expensive sensors and maintaining them as well as the complexity of data collection, transmission, and processing from such a broad set of sensors is difficult.

In addition, inferring displacement from acceleration measurement can distort the data (depending on the boundaries conditions). Acceleration measurements are suited for short integration time up to tens of second and displacement measurements are advantageous over acceleration for long integration time, typically starting somewhere from several seconds or tens of seconds.

In one or more examples, the present invention discloses a new electro-optical system that selects regions of interest of a structure that one would have otherwise instrumented with a series of inertial accelerometers, except that it produces displacement measurements by tracking the motions of recognizable visual targets with an accuracy that is limited by the camera's physical diffraction limit using video-images of the structure. In various embodiments, the system is robust, in the sense that it is appropriate for diverse characteristics of optical targets. In various examples, the measurement is achieved even in difficult environmental circumstances (such as irregular changes of background light and luminosity) and/or without assuming to have access to the structure that we monitor.

In one or more examples, the structure is a road bridge and the live-loads are vehicles traversing the bridge. Those vehicles induce small perturbations to the equilibrium of the bridge since the bridge's weight is much larger than those of the vehicles. That is, the deformation of the bridge is a linear function of the vehicle weights as well as their locations on the bridge. Therefore, one can deduce the vehicle weights from the bridge deformation once the system is calibrated.

In various examples, vehicle locations, speeds, and lengths, Department of transportation (DOT) numbers (for trucks), and plate numbers can be found by processing live traffic video in real-time. By combining these pieces of information with the dynamic motion of the bridge, the weight of each vehicle traversing the bridge can be deduced. In various examples, the output data can be continuously transmitted to cloud-based servers over cellular communication links for real-time viewing, archiving, and additional data mining. Embodiments of the system described herein exhibit advantages over Weigh-In-Motion sites (WIM)— deducing the weights of trucks as they pass over either load cell scales, bending plate scale, or piezoelectric sensors embedded inside the pavement of the road—of being immune to the variation of the load that the moving a vehicle applies to the road. In embodiments described herein, the contact area is the entire span of the bridge that trucks cross (which is much longer than the active surface of embedded sensors used in WIM sites). In some examples, the variation of the road surface as a function of distance is a zero-mean stationary random process over the length of a bridge.

Similarly, in one or more examples, the time varying parameters of vehicle's suspension system and engine induced force are zero mean over the time that it takes a vehicle to cross a bridge. That is why, in one or more examples, independently of the conditions of the road and the vehicle our system detects consistently clear deflections of bridge decks as vehicles traverse. That is also why, in one or more examples, our system eliminates the need of AS™ 1318-09 standards (in the US) requiring the height of the pavement do not change more than 3 mm over a distance of 5 meters anywhere for 60 meters before the WIM Scale to 30 meters past the scale.

Embodiments of an electro-optical device according to embodiments described herein include, but are not limited to, the following.

1. An electro-optical device, comprising: an imaging system;
   a sensor outputting signals in response to one or more images of an object imaged on the sensor using the imaging system;
   an analog amplifier connected to the sensor, the analog amplifier amplifying the signals using an analog process so as to form an analog output;
   an analog to digital converter (ADC) connected to the analog amplifier, the ADC converting the analog output into a digital data;
   a demosaicing module connected to the ADC, the demosaicing module formatting the digital data into digital image data comprising the digital data associated with appropriate pixel positions on a display so that the digital image data can be used to construct the images of the object on the display;
   a video card comprising a graphics processing unit converting the digital image data into a time series of the images readable by a computer;
   the computer connected to the processor, wherein the computer identifies a target in the time series of the images; and
   a transmitter transmitting information comprising an identification of the target.
2. The device of embodiment 1, wherein:
   the device does not include image stabilization or image stabilization is disabled, the image stabilization comprising software and/or hardware that reduces blurring of the images associated with the motion of the sensor; and
   the device does not include autofocus or the autofocus is disabled, the autofocus comprising software and/or hardware that automatically focuses the image of the object on the sensor.
3. An electro-optical device, comprising:
   an image sensor outputting signals in response to a time series of images captured on the image sensor;
   a computer connected to the image sensor so as to receive the signals, wherein the images comprise a time series of image frames indexed with an integer k and the computer identifies a target inside the $k^{th}$ image frame using an image of the target in the $(k-1)^{th}$ image frame.
4. The device of embodiment 3, wherein the computer receives the signals from an HDMI output or SDI output of the demosaicing unit of a camera comprising the image sensor, the device further including a video image capture card comprising a graphics processing unit converting digital image data outputted from the camera in response to the signals into the time series of the image frames readable by the computer.

5. The device of embodiment 3, further comprising:
an imaging system connected to the image sensor, the sensor outputting the signals in response to the time series of the images of an object imaged on the sensor using the imaging system;
a sensor outputting signals in response to one or more images of an object imaged on the sensor using the imaging system;
an analog amplifier connected to the sensor, the analog amplifier amplifying the signals using an analog process so as to form an analog output;
an analog to digital converter (ADC) connected to the analog amplifier, the ADC converting the analog output into a digital data;
a demosaicing module connected to the ADC, the demosaicing module formatting the digital data into digital image data comprising the digital data associated with appropriate pixel positions on a display so that the digital image data can be used to construct the images of the object on the display;
a video card comprising a graphics processing unit converting the digital image data into the time series of the image frames readable by a computer; and
the computer connected to the processor, wherein the computer identifies the target in the time series of the image frames.

6. The device of embodiment 3, wherein:
the computer comprises a multi-core processor including a plurality of processor cores and the computer identifies the target using a parallel process using the image of the target in the $(k-1)^{th}$ image frame, the parallel process is divided into smaller algorithm pieces that are each executed separately in one of the processor cores,
the outputs of each of the processor cores are combined and used to identify the target.

7. The device of embodiment 6, wherein:
the target comprises a plurality of targets each captured in one of a plurality of $(k-1)^{th}$ image frames,
the smaller algorithm pieces each identify one of the plurality of targets simultaneously and in real time with motion of each of the targets, in real-time.
the outputs of each of the processor cores are combined and used to identify each of the targets so that a single one of the image sensors is used to track the motions of each of the plurality of the targets.

8. The device of embodiment 3, wherein the computer correlates the $k^{th}$ image frame with the image of the target in the $(k-1)^{th}$ image frame so as to determine a location of the target in the $k^{th}$ image frame.

9. The device of embodiment 8, wherein the image frames comprise images of a region of interest as a function of time, the device further comprising:
a plurality of lasers physically connected to the image sensor so that the lasers are fixed relative to the image sensor, the lasers each transmitting an electromagnetic beam to the region of interest so that images of the beams appear as spots in the image frames;
the computer associates certain motions of the beams identified in the image frames with rotation of the array, the certain motions comprising motions that are a function $K(L, \alpha, \theta_n)$ where $\alpha$ is an orientation angle of the image sensor, $\theta_n$ are the angles of orientation of each of the lasers, and L is a distance between the array and the region of interest; and
the computer determines the location of the target taking into account the rotation of the image sensor.

10. The device of embodiment 9, wherein the computer disregards any displacement of the target in the image frames that are associated with the rotation of the array.

11. The device of embodiment 10, wherein the computer determines the location as a function of time so as to measure a motion in the location of target in response to a force applied to the target.

12. The system of embodiment 11, wherein the target is located on a road or a bridge and the force is a weight of a vehicle traveling on the road or the bridge.

13. A system comprising:
a plurality of the devices of embodiment 3, each of the devices determining the location of a different target in one of a plurality of regions of interest as a function of time, each of the regions of interest on different areas of a structure; or
a single one of the devices of embodiment 2, wherein the device determines the location of a plurality of different targets in one of a plurality of regions of interest as a function of time, each of the regions of interest on different areas of a structure; and
a processor connected to the plurality of the devices or the single one of the devices, the processor determining a force applied to the structure using the motions of each of the targets determined in each of the devices.

14. The system of embodiment 13, wherein the processor uses the motion of the structure in combination with a speed (e.g., as determined from an additional video camera or traffic flow camera or otherwise) of a vehicle traveling on the bridge to determine the force comprising weight of the vehicle traveling on the structure comprising a road or a bridge.

15. The system of embodiment 14, wherein the processor uses additional data comprising at least one vehicle characteristic including vehicle length/dimension, united states department of transportation number, and vehicle license plate so as to identify the vehicle.

16. The system of embodiment 14, wherein the system measuring the weight of the vehicle comprises the bridge in combination with the electro-optic device.

17. The system of embodiment 13, wherein the processor:
obtains a matrix D:

$$D \begin{Bmatrix} D_1 \\ \vdots \\ D_n \end{Bmatrix}$$

where $D_1 \ldots D_n$ are the motions of the targets obtained from each of the devices as a function of time;
determines a mean value $\mu_n$ for each of the motions $D_1 \ldots D_n$, determines a matrix X:

$$X \begin{pmatrix} E[(D_1-\mu_1)(D_1-\mu_1)] & \ldots & E[(D_1-\mu_1)(D_n-\mu_n)] \\ \vdots & \vdots & \vdots \\ E[(D_n-\mu_n)(D_1-\mu_1)] & \ldots & E[(D_n-\mu_n)(D_n-\mu_n)] \end{pmatrix}$$

where the operator E denotes the expected (mean) value of its argument; and
determines the force comprising a weight W of a vehicle traveling on the structure comprising a road or a bridge according to $(X^T X)^{-1} X^T D = W$.

18. The system of embodiment 13, further comprising a transmitter transmitting the real-time motions and the locations to the processor using a cellular wireless network.

19. The system of embodiment 18, further comprising a cloud based server including the processor.
20. The system of embodiment 19, further comprising a power supply powering the device so that the device is autonomously powered.
21. The system of embodiment 3, wherein the computer identifies or determines a location or motion of the target even when a shape of the target is changing during the measurement (tracking algorithm independent of shape).
22. The device of embodiment 9, further comprising an increased number of the lasers, greater than two, so that the computer uses the certain motions of the beams to measure a spatial rotation of the target relative to an inertial frame of reference in addition to measuring a rotation of the image sensor as well a displacement of the target along an optical axis of the image sensor (the range), because a number of independent equations (or measurements) exceeds the number of unknowns.
23. An electro-optic device, comprising:
a sensor outputting signals in response to a time series of image frames indexed with an integer k and captured on the array;
a plurality of lasers physically connected to the array so that the lasers are fixed relative to the array, the lasers each transmitting an electromagnetic beam to the region of interest so that images of the beams appear as spots in the image frames; and
a computer connected to the array so as to receive the signals, wherein:
the computer associates certain motions of the beams identified in the image frames with rotation of the array, the certain motions comprising motions that are a function K(L, α, $\theta_n$) where α is an orientation angle of the array, $\theta_n$ are the angles of orientation of each of the lasers, and L is a distance between the array and the region of interest; and
the computer determines the location of the target taking into account the rotation of the array.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

1. Example Device Structure

FIG. 1A illustrates an electro-optical system 100 comprising a portable and stable mount 102; an imaging apparatus or imaging system 104 comprising imaging optics 106; and an image sensor 108 connected to the imaging system or imaging apparatus 104.

Example imaging optics include, but are not limited to, a lens or system of lenses (telephoto lens with optical zoom or telescope) or a mirror or mirror system. FIG. 1B, FIG. 1C, and FIG. 1D illustrate examples wherein the imaging optics include arrangement of curved mirrors, where rays of light are collected and focused and the resulting image magnified. In one or more further examples, the imaging optics includes a super zoom photography lens composed of a series of lenses equivalent to a single lens with a large focal length.

An example image sensor includes an array of pixels 108a including, but are not limited to, a Charge Coupled Device (CCD) or Complementary metal-oxide-semiconductor (CMOS) pixels or sensors (which may also include an amplifier), e.g., as may be found in a camera. In one or more examples, the imaging apparatus comprises a telephoto lens optical zoom apparatus connected to a high-resolution commercial video camera. Example cameras include a Digital Single Lens Reflex (DSLR) camera or other high resolution camera (including smartphone or cell phone) having Megapixel resolution.

In various examples, the electro-optical system further includes an optical adapter mounting the imaging optics (optical instrument) into the frame of the sensor. Examples include, but are not limited to, a T-mount adapter for EF camera (Bower T-E08) or a T mount adapter for four thirds cameras.

Conventional camera systems digitize and compress the video inside the camera, interfering with the ability to achieve high spatial resolution. The imaging system according to embodiments described herein includes a digitizer unit 110 connected to the pixels via an interface such as an HDMI (High-Definition Multimedia Interface) interface so that the digitizer receives analog video signals generated by the pixels through the interface. The digitizer unit converts, in real time, the analog video signals into a high-resolution digital format that is streamed to the embedded computer.

In one or more examples, the electro-optic device 100 includes an analog amplifier 112 providing analog amplification just after the image sensor; an analog to Digital Converter (ADC) after the analog amplification; a demosaicing module 114 reconstructing the full image from the digitized signal coming out of the ADC; and a (e.g., lossless or sufficiently lossless) high pixel resolution and high speed video-image capture card 116 converting the signal coming out of the demosaicing module into a series of digitized video-images that is readable by a computer 118; the computer 118; and a transmission unit (transmitter 120). In one or more examples, digitizer unit includes ADC and/or demosaicing module 114.

The embedded computer processes the real-time video data using a tracking (e.g., pixel manipulation) algorithm (see section 2) to calculate, in real ambient luminosity conditions, sub-millimeter 3D displacement of a target 700 (e.g., individual bolts on the bridge deck or superstructure).

FIG. 2A illustrates an exemplary process flow, comprising imaging 202 on a sensor using optics 200; analog amplification 204; analog to digital conversion 206; demosaicing 208; video image capture using video image capture card 210; computation in computer 212; and data transmission 214. One of the surprising characteristics of our system is the ability to transform the data coming out of its image sensor into a computer-readable format and stream the data to a computer without any loss of information (e.g., relevant to identifying a target) in real-time and at a high frame rate. At the same time, embodiments of the electro-optic system 100 do not use image stabilization techniques that are typically used in the form of hardware (lenses, cameras) or software that attempt to reduce shaking and vibration of the camera as well as the motion of objects appearing in the video-images in some cases. Such image stabilization techniques can induce errors in our measurement.

Figure 2B:
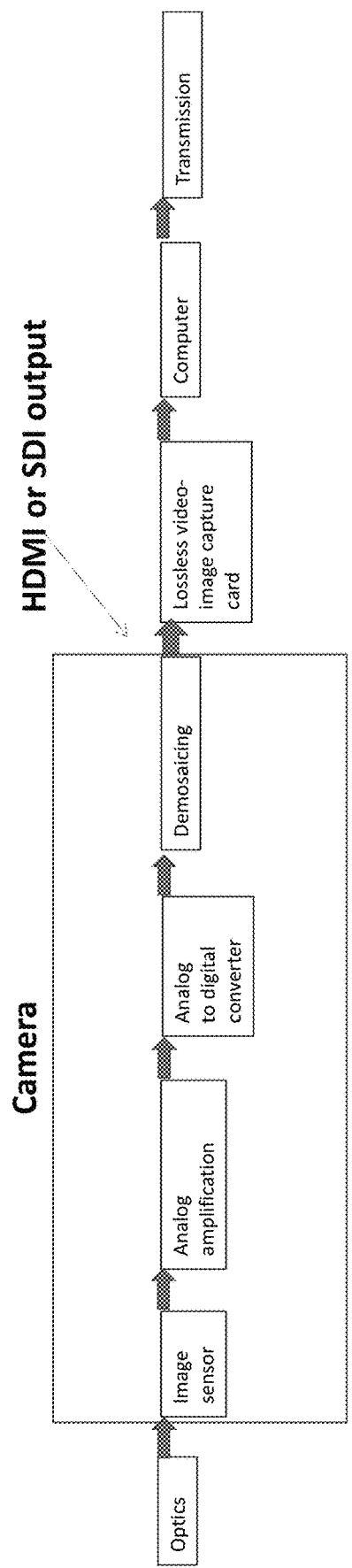
FIG. 2B illustrates an exemplary process flow using and HDMI or SDI output, according to one or more embodiments.

FIG. 2B illustrates an embodiment wherein the electro-optic system includes a camera including the image sensor, analog amplification, analog to digital conversion; and demosaicing and the signal is outputted from the camera, after the demosaicing section, through the HDMI or SDI output. Example cameras include, but are not limited to, a Blackmagic Design Micro Studio Camera 4K with four thirds camera mount [4], or a Canon EOS Rebel T64 camera, or Canon EOS T7i DSLR Camera [3]. In one or more examples, high bandwidth cables connect the HDMI output or the SDI output to the computer so as to transmit high resolution-video data at high rate to the computer. Example HDMI cables include, but are not limited to, HDMI 2.1 cable having a bandwidth of 48 Gbps to carry resolutions up to 10K with frame rates up to 120 fps (8K60 and 4K120). Example SDI cables include, but are not limited to, DIN 1.0/2.3 to BNC Female Adapter Cable.

Example image capture card 116 include, but are not limited to, an INOGENI USB 3.0 4K HDMI Video Capture Card; HDMI input, USB 3.0 output, e.g., used to stream the data to a computer when the video-image capture card is outside of the computer.

Additional devices used in one or more examples include a converter such as, but not limited to, a Blackmagic Design SDI to HDMI 6G Mini Converter used to transfer SDI input data into HDMI; and/or a Blackmagic Design DeckLink Mini Recorder 4k connected to a computer mother board.

The electro-optic device further includes a series of lasers 122 (e.g., laser pointers) which are stationary (e.g., fixed using screws or adhesive) relative to the image sensor 108 or camera/sensor pixels 108a and are positioned to illuminate points on a structure having a target. The computer determines horizontal motion (range) of the structure and corrects for camera rotation by monitoring the displacements of the laser points/spots in the video-images.

The electro-optic device 100 further includes a power supply 124. In one or more examples, all components 102, 104, 106, 108, 110, 112, 114, 116, 118, 120, 122 in the electro-optic device 100 are housed in a single portable unit (housing 126). In one or more embodiments, the electro-optic device 100 powered is autonomously powered (self sufficient) with a battery and the entire system 100 consumes less than 1000 Watts, less than 400 Watts, or less than 200 watts of power. In one or more examples, lasers 124 are physically attached to housing using fixing mechanism (e.g., screw, adhesive).

Also illustrated in FIG. 1 is a transmitter 120 for transmitting data from the electro-optic device. In one or more examples, the transmitter is configured to transmit the data using a cellular communication link or cellular wireless network, e.g., to a cloud based server. The electro-optical system output data size can be relatively small and have a rate of few kilobytes per second.

Figure 3:
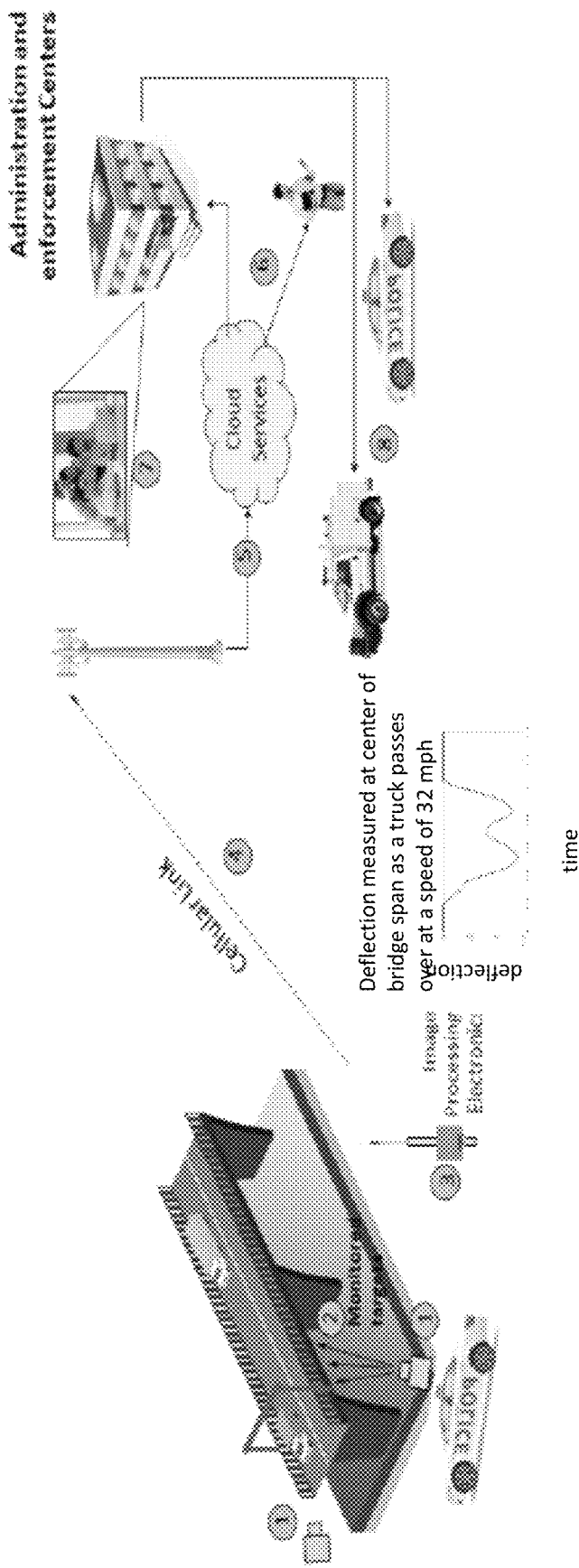
FIG. 3 illustrates the electro-optic device in a cellular network, according to one or more embodiments.

FIG. 3 illustrates a cloud based server 5 connected to a plurality of the electro-optic devices 100 (labeled 1 in FIG. 1) monitoring targets 2, for real-time viewing 6, 7; archiving, and additional data mining of the output data generated in the electro-optic device. As described herein, the electro-optic device includes image processing electronics 3 (e.g., amplifier 112, ADC, demosaicing unit 114, and card 116). A cellular link 4 transmits the data from the electro-optic devices 1 to the server 5. Processed data can be used by law enforcement 8.

2. Example Tracking Algorithm Implemented by the Computer 118 of the Electro-Optic Device Feature tracking and motion detection algorithms have existed for many years in the area of computer vision and several of them have been used to track the motion of a civil structures.

A tracking algorithm according to one or more examples of the present invention comprises:
(a) selecting regions of interest of a structure (e.g., that otherwise might be instrumented with a series of inertial displacement meters);
(b) utilizing a normalized two-dimensional cross-correlation function to determine the position of the (2×2) matrix $\zeta_2$ (x, y, $t_k$) inside the (2×2) matrix $\zeta_1$ (x, y, $t_n$) using a modified image template matching technique. $\zeta_2$ (x, y, $t_k$) is the two-dimensional matrix representation of the digital image associated with the image of a target extracted from the frame number k in the video images sequence. Similarly $\zeta_1$ (x, y, $t_n$) is the two-dimensional matrix representation of the digital image associated with the video frame number n in the video images sequence. By finding the pair of $\eta_x$ and $\zeta_y$ coordinates that maximized, $$\gamma(\eta_x, \eta_y, t_n, t_k) = \frac{1}{N\sigma_1\sigma_2} \sum_{x,y} (\zeta_1(x, y, t_n) - \overline{\zeta_1(t_n)})(\zeta_2(x - \eta_x, y - \eta_x, y - \eta_y, t_k) - \overline{\zeta_2(t_k)})$$

the computer calculates the location of the target inside the image frame number k, where N is the number of pixels in $\zeta_2$, $\sigma_1$ is the standard deviation of $\zeta_1$, $\overline{\zeta_1}$ is the average of $\zeta_1$, and similarly $\sigma_2$, and $\overline{\zeta_2}$ represent the same quantities relative to $\zeta_2$. This approach has the advantage of being invariant to global brightness change caused by exposure and luminosity variation conditions during the course of the film footage since the mean image brightness is subtracted from each pixel value.

However, rotations of the target relative to the image induce errors and the two-dimensional cross-correlation is rotation-variant. The tracking algorithm presented herein overcomes this problem by updating at each iteration the matrix that represents the image of the target. As long as the rate of video-images is large enough compare to the changes of shape and size of the image of the target; the algorithm is invariant to the spatial rotation of the target as well as changes in the shape of the target (i.e., the tracking algorithm can determine motion of the target even when the shape of the target changes during the measurement).

In general, geometric image distortions degrade (and often broaden) the output of the correlation peak, which makes its detection difficult. That is even more so when the usable data of the image is represented by close contrast values. In addition to updating the template image at each iteration, the dependence of the algorithm on image distortions has been decreased by adjusting—at each iteration—the contrast in the section of the image where the search takes place.

In one or more examples, the algorithm is used to only measure the displacement of a target—i.e., the computer 118 measures changes in position of the image of a target in the video-images. Such a differential measurement eliminates all common-errors.

In one or more examples, the algorithm outputs displacement measurements by tracking the motions of recognizable features with an accuracy that is limited to the greatest common denominator of the diffraction-limit and physical pixel size.

Thus, embodiments of the electro-optic system disclosed herein are robust, in the sense that the electro-optic system can detect track optical targets having diverse characteristics even in difficult environmental circumstances such as irregular changes of background light and luminosity of the targets as perceived from the camera. Moreover, the electro-optic device 100 using the tracking algorithm does not require access to the structure that is monitored nor is the knowledge of the shape of the target required in advance. A such, the electro-optic device implementing the tracking algorithm can measure the displacement of a target (e.g., individual bolts or any distinctive feature on the bridge deck) and correct for distortions of the shape of the target as happens in practice when the bridge moves.

The algorithm is also suitable for parallel computing, thereby enabling real-time implementation. In one or more examples, the computations of the algorithm can be divided into smaller pieces that each can be executed separately and then combined at the end to get the final result. A multi-core processor computer executes those processes simultaneously; that is in real-time. The parallel execution of the algorithm reduces the execution time as well as increasing the computational power (the rate of instructions carried out per unit of time). A net result is that each sensor 100 monitors multiple targets simultaneously as well as tracking the motion of each target in real-time.

3. Cancelling the Unwanted Effects of Camera Vibration

In another embodiment of the present invention, orientation of the camera relative to an inertial reference frame can be measured using consumer-grade level measurement tools. Therefore, the rotation matrix that characterizes the transformation from the frame of reference of the camera to an inertial reference frame is deduced.

Specifically, in many applications the camera is not stationary in the absolute sense and does vibrate. The camera can be assumed to be stationary as long the errors that its vibrations induce to the measurement are smaller than the spatial resolution of the measurement (i.e., the camera's vibrations are neglected only if the motion of the faraway target is measured to be zero). However, the resolution afforded by one or more embodiments of the electro-optic device 100 described herein means this is not the case in many applications. In the cases, a technique for correcting for and subtracting out displacements resulting from camera vibrations is needed.

The electro-optic device described herein is capable of continuously measuring the dynamic rotation of the camera with sub-milliradian resolution as well as the horizontal displacement of the structure relative to an inertial reference frame. The technique relies on measuring the displacement of points on the structure (e.g., bridge deck) that are created by lasers 122 (e.g., laser pointers) that are stationary relative to the camera or sensor 108. Specifically, the technique uses laser-pointers to measure the dynamic pitch and roll of the camera or sensor 108 and the horizontal displacement of the structure as well as its rotation relative to an inertial reference framework.

Changes in the wavelength and temperature of a laser pointer do not change the location where the beam hits the target-structure. However, they change the divergence angle of the beam, which changes the width of the beam at the bridge. These changes are negligible in our application but even then the tracking algorithm described in section 2 would monitor the motions of the points independently of changes in their shapes. Changes in the index of refraction of the air may change locations of the points on the bridge but since we measure displacement they cancel out.

The tracking algorithm described in section 2 can be used to monitor the location of the beam of light at the structure. The measurements using the tracking algorithm are invariant to the shape and changes in the shape of the beam and are also invariant to the changes in luminosity of the target. As a result, the tracking algorithm can be used to measure the displacement of the laser beam at the target independently of its shape and variation in laser light intensity.

For the purposes of the following analysis, it is assumed that the laser beam is a plane wave since the target is in the far-field we and show in our schematics it direction of propagation.

Figure 4A:
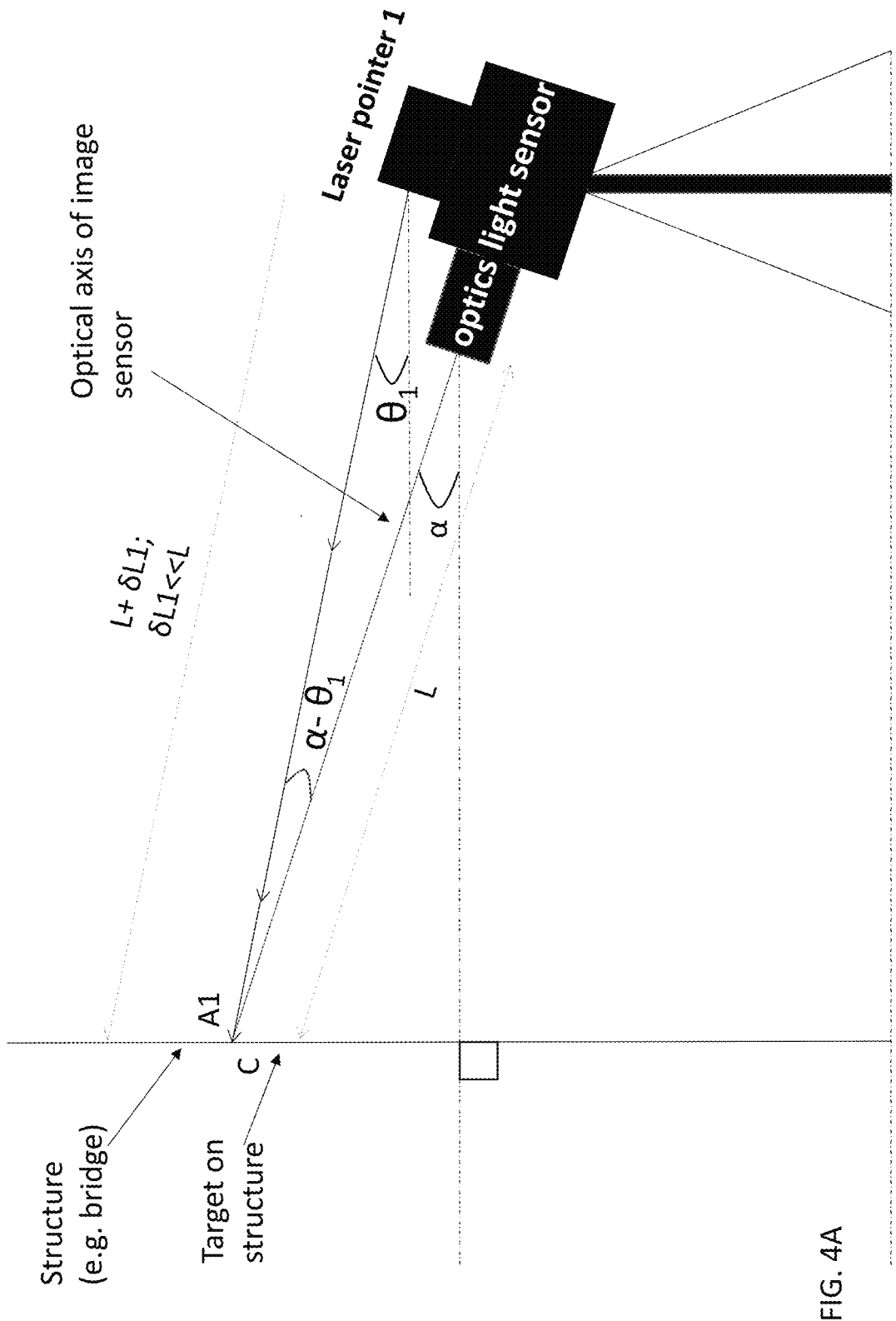
FIG. 4A illustrates an apparatus including a single laser pointer mounted to the camera prior to rotation of the apparatus. The laser beam hits the structure at point A1/The axis of the camera intercepts the structure at point C. The laser pointer is fixed to the physical apparatus that hold the camera. It is stationary relative to the frame of the camera.
Figure 4B:
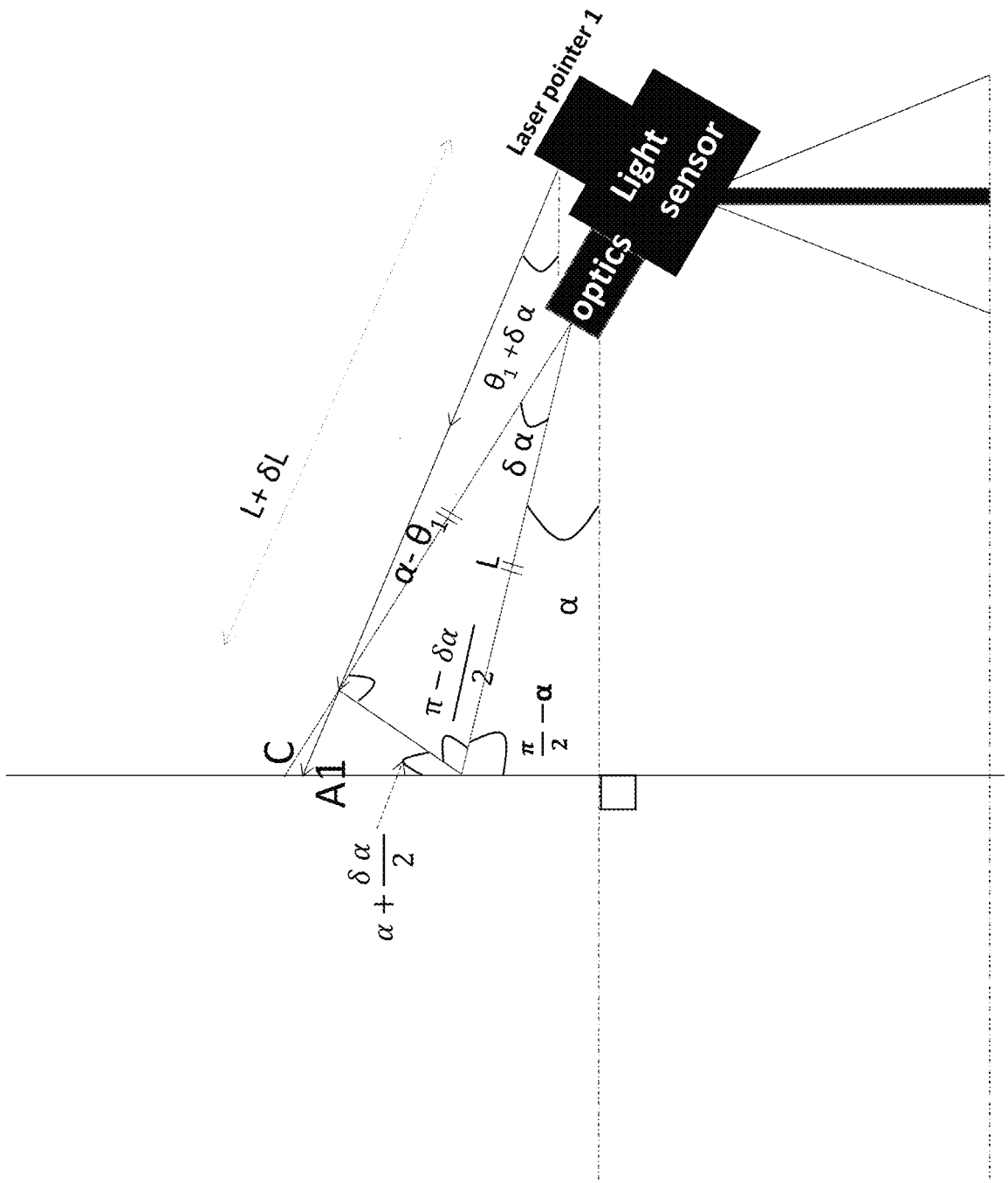
FIG. 4B illustrates the location of the laser beam spot A1 relative to the center of the image C changes after the physical apparatus of the camera rotates by an angle $\delta\alpha$.
Figure 4C:
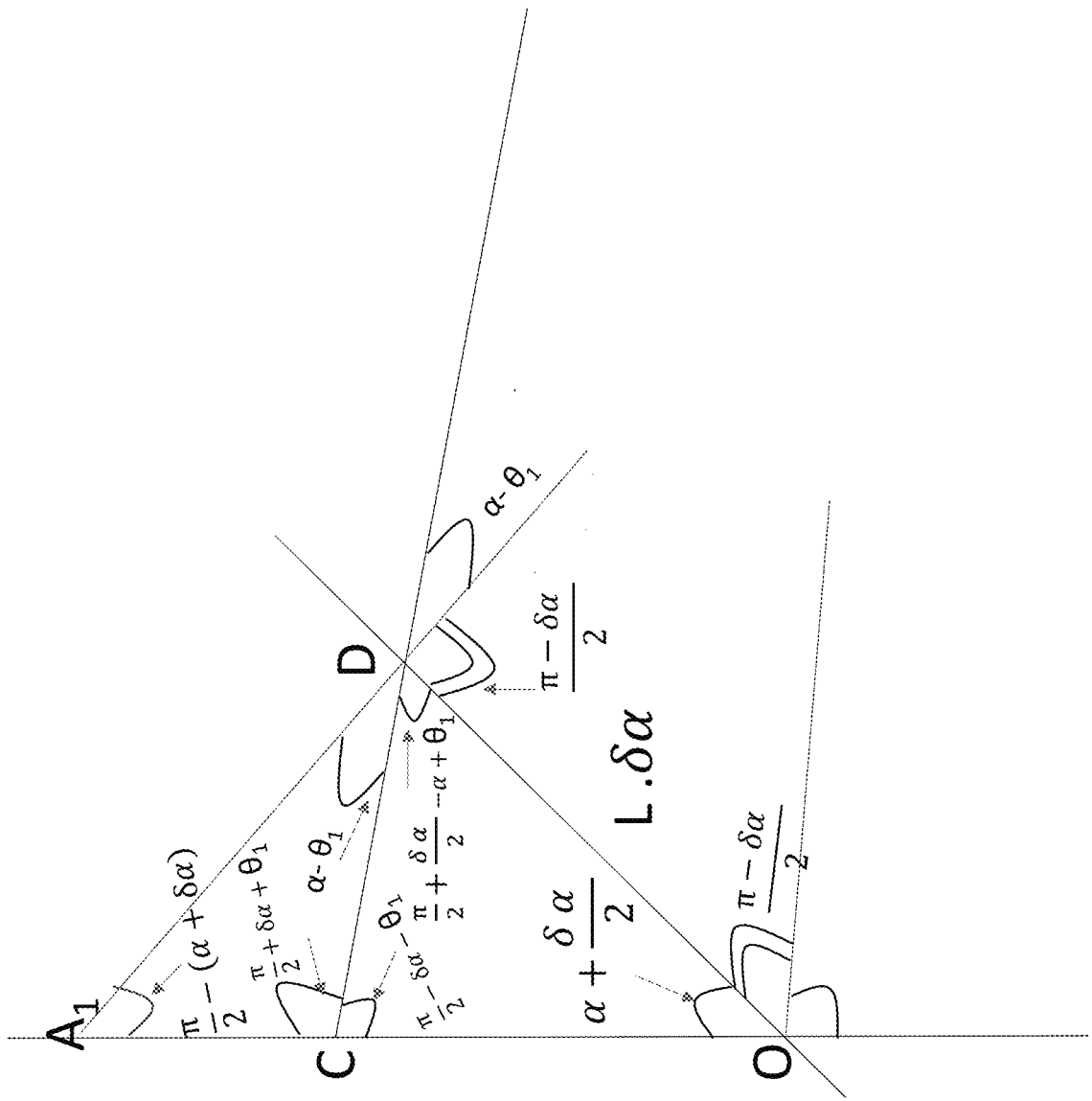
FIG. 4C is a close up view of FIG. 2B.
Figure 4D:
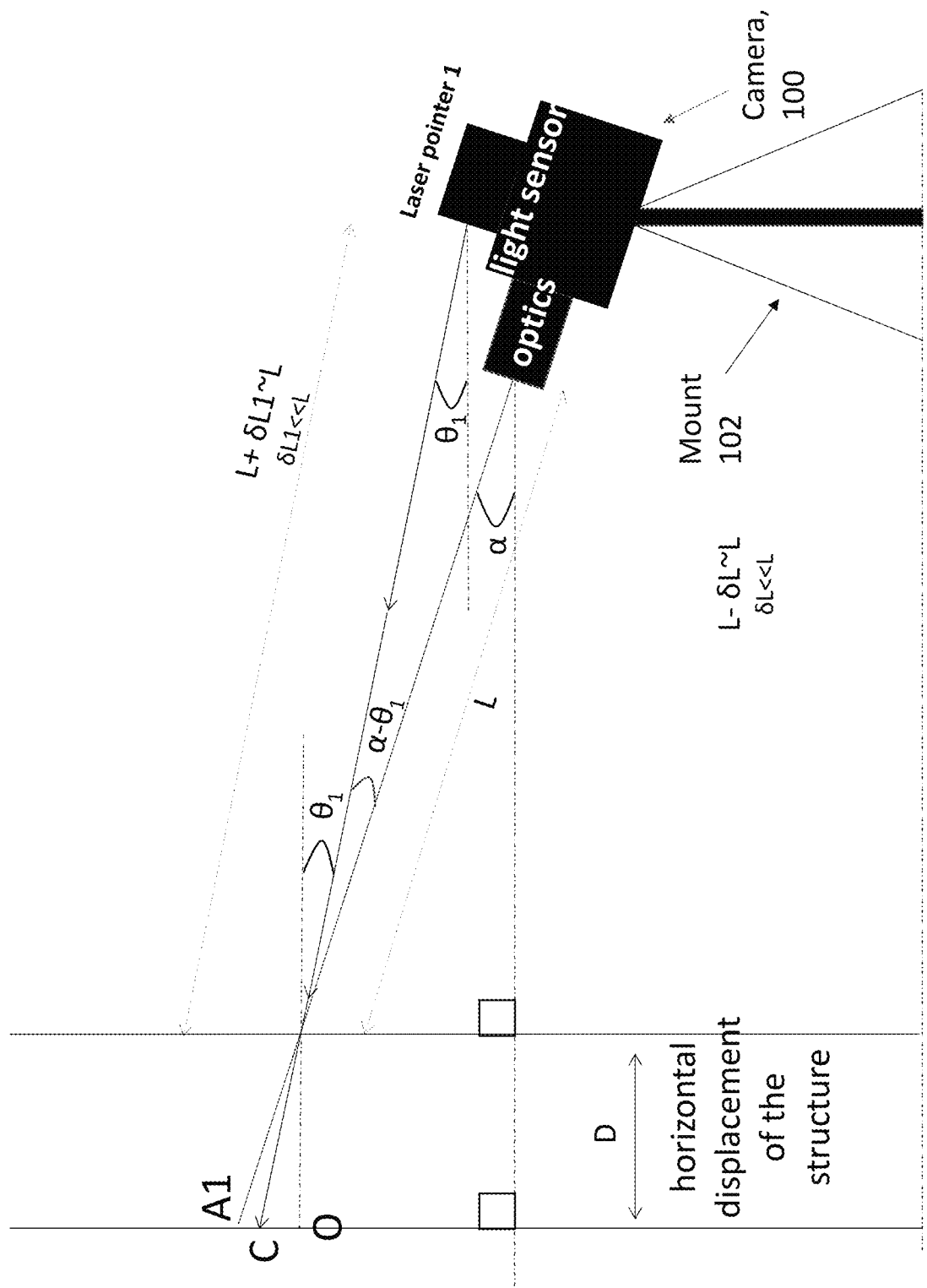
FIG. 4D illustrates a horizontal displacement of the structure is also dislocating the laser beam spot in the video-image.

FIG. 4B and FIG. 4C illustrate the effects of camera rotation and structure displacement on the position of the laser beams. Analysis of FIG. 4B and 4C yields the following relationships.

$$\frac{L \cdot \delta\alpha}{\sin\left(\frac{\pi}{2} - \delta\alpha - \theta_1\right)} = \frac{OC}{\sin\left(\frac{\pi}{2} + \frac{\delta\alpha}{2} - \alpha + \theta_1\right)}$$

$$\frac{CD}{\sin\left(\frac{\pi}{2} - (\alpha + \delta\alpha)\right)} = \frac{A_1 B}{\sin(\alpha - \theta_1)}$$

$$AC = \sin(\alpha - \theta_1) \frac{BD}{\sin\left(\frac{\pi}{2} - (\alpha + \delta\alpha)\right)} =$$

$$A_1 C = \frac{\sin(\alpha - \theta_1)}{\sin\left(\frac{\pi}{2}(\alpha + \delta\alpha)\right)} \cdot \frac{\sin\left(\frac{\pi}{2} + \frac{\delta\alpha}{2} - \alpha + \theta_1\right)}{\sin\left(\frac{\pi}{2} - \delta\alpha - \theta_1\right)} \cdot L \cdot \delta\alpha$$

$$\sin(\alpha - \theta) \frac{CD}{\sin\left(\frac{\pi}{2} - (\alpha + \delta\alpha)\right)} = \frac{\sin(\alpha - \theta)}{\sin\left(\frac{\pi}{2} - (\alpha + \delta\alpha)\right)} \cdot \frac{\sin\left(\frac{\pi}{2} + \frac{\delta\alpha}{2} - \alpha + \theta\right)}{\sin\left(\frac{\pi}{2} - \delta\alpha - \theta\right)} \cdot L \cdot \delta\alpha$$

$$A_1 C = \frac{\cos(\alpha - \theta)}{\cos(\alpha + \delta\alpha)} \cdot \frac{\cos\left(\delta\alpha \frac{\delta\alpha}{2} - \alpha + \theta\right)}{\cos(\delta\alpha - \theta)} \cdot L \cdot \delta\alpha \text{ assuming}$$

$$\delta\alpha \ll \alpha$$

$$\frac{\delta\alpha}{\alpha} < 10^{-3}$$

$$A_1 C \sim \frac{(\alpha - \theta)}{\cos(\alpha)} \cdot \frac{1}{\cos(\theta)} \cdot L \cdot \delta\alpha$$

$$A_1 C \sim \frac{(\alpha - \theta)}{\cos(\alpha)} \cdot \frac{1}{\cos(\theta)} \cdot L \cdot \delta\alpha$$

$$\frac{D}{\cos\alpha} = \frac{OA_1}{\sin(\alpha)}$$

$$\frac{L\theta_1}{\sin\left(\frac{\pi}{2} - \alpha - \theta_1\right)} \sin\left(\frac{\pi}{2} + \theta_1\right) = L \cdot \theta_1 \frac{\cos(\theta_1)}{\cos(\alpha + \theta_1)}$$

$$\frac{D}{\cos(\alpha - \theta_1)} = \frac{OC}{\sin(\alpha - \theta_1)}$$

$$A_1 C = D(\tan\alpha - \tan(\theta_1 - \alpha))$$

Using the above relationships, $$A1C{\sim}D{\cdot}\theta_1$$

The above relationships demonstrate that both a range displacement of the structure and a rotation of the camera displaces the location of the laser beam in the video-images.

Displacement of the beam caused by a displacement D of the structure along the range is given by A1C~θ₁.D. Displacement of the beam caused by a rotation δα is given by $$A_1 C = \left( K_1 = \frac{\sin(\alpha - \theta_1)}{\cos(\alpha + \delta\alpha)} \cdot \frac{\cos\left(\frac{\delta\alpha}{2} - \alpha + \theta_1\right)}{\cos(\delta\alpha - \theta_1)} \cdot L \right) \cdot \delta\alpha$$

$$K_1 \sim \frac{(\alpha - \theta_i)}{\cos(\alpha)} \cdot \frac{1}{\cos(\theta_1)} \cdot L$$

Figure 4E:
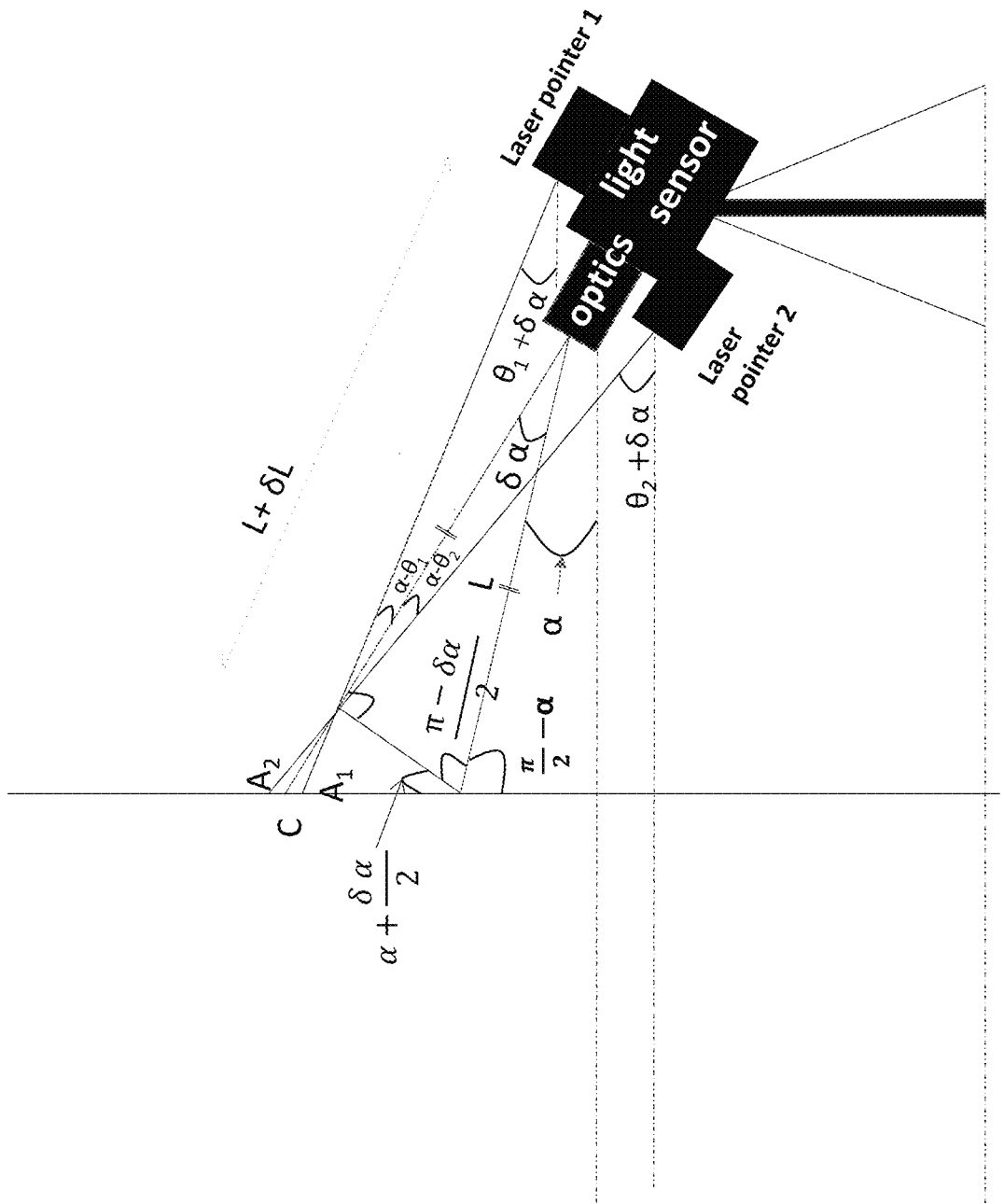
FIG. 4E illustrates an apparatus including two laser pointers mounted to the camera prior to rotation of the apparatus.

So that $A_1 C = (K_1 \quad \theta_1) \begin{pmatrix} \delta\alpha \\ D \end{pmatrix}$ Adding a second laser pointer, as illustrated in FIG. 4E enables deduction of the a horizontal displacement of the bridge by D and an angular vibration of the frame of the camera (rotation of the camera relative to a inertial reference frame by $\delta\alpha$) by measuring the change in the relative distance between A1 and A2, which are the points created by laser 1 and laser 2, respectively, on the structure (e.g., bridge). C represents the center of the image (or center of the object frame being imaged on the structure). ($\alpha$, $\theta_1$, $\theta_2$) are the initial orientation angles of respectively the (camera, laser 1, laser 2) relative to an inertial reference frame. By measuring the displacement of A1 and A2 in the video-images, we deduce D and $\delta\alpha$ and therefore eliminate the errors that the camera vibrations induce into the measurements. The relation between $$\begin{pmatrix} A_1 C \\ A_2 C \end{pmatrix} \text{ and } \begin{pmatrix} \delta\alpha \\ D \end{pmatrix}$$

is expressed as;

$$\begin{pmatrix} A_1 C \\ A_2 C \end{pmatrix} = \begin{pmatrix} K_1 & \theta_1 \\ K_2 & \theta_2 \end{pmatrix} \cdot \begin{pmatrix} \delta\alpha \\ D \end{pmatrix};$$

where $$K_2 = \frac{(\alpha - \theta_2)}{\cos(\alpha)} \cdot \frac{1}{\cos(\theta_2)} \cdot L;$$

and where L is the distance from the camera to the bridge as measured by a commercial-grade range finder during the set-up process. We can thus deduce $$\begin{pmatrix} \delta\alpha \\ D \end{pmatrix};$$

$$\begin{pmatrix} \delta\alpha \\ D \end{pmatrix} = \begin{pmatrix} K_1 & \theta_1 \\ K_2 & \theta_2 \end{pmatrix}^{-1} \begin{pmatrix} A_1 C \\ A_2 C \end{pmatrix}$$

Thus, the equations above show the existence of a matrix $$\begin{pmatrix} \delta\alpha \\ D \end{pmatrix},$$

when applied to the movements of the laser pointers, that provides the vibration of the camera as well as the displacement of the target along the optical axis of the camera (i.e. range). Moreover, the matrix is a function of the orientation and location of the camera (relative to an inertial frame of reference), which is known, regardless of what exactly the matrix expression is. Further information is extracted by monitoring changes in the shape and size of the lasers' points created at the target structure.

Thus, the use of two lasers can be used to correct for, or measure, rotation of camera with less than (e.g., sub) milliradians resolution caused by, e.g., vibration of camera; as well as measuring the displacement of target along the optical axis of camera (range of the camera to the region of interest). These unknowns can be determined because number of lasers is greater than number of unknowns.

Similarly, the spatial (e.g. three dimensional (3D)) rotation of the structure can be deduced by increasing the number of laser pointers (more than 2) shining at the structure.

4. System Calibration

The electrooptic system 100 can be calibrated by measuring the displacements that a known-weight vehicle induces as it traverses a bridge. Alternatively, the electro-optical system can automatically self-calibrate relative to the weights of trucks that have just been weighed on a Commercial Vehicle Enforcement Facility (CVEF). The electro-optic system can be connected to the computer network of the commercial vehicle code enforcement that operates nearby weigh stations, so that the electro-optic system will know if a truck has been recently weighed on a weigh station as it traverses the bridge. In other words, the electro-optic system can self-calibrate by associating the displacement that the truck causes to the bridge with its weight as reported by the CVEF nature of the system.

5. Measuring the Dynamic Response: Deducing the Loads (Inputs) from the Displacement Measurements (Outputs)

The impulse response of a structure (e.g., bridge) is its mechanical dynamic behavior in response to any external force. Knowledge of impulse response enables deduction of the locations of the point loads that are applied to the bridge at each instant solely from the measurements of the displacements of the targets. This information is useful in the case of a multi-lane bridge where several trucks drive simultaneously over the bridge. Moreover, the impulse response also enables measurement of the axle weight of each vehicle in addition of measuring the gross weight.

A single camera comprising the electro-optic device 100 as described herein can simultaneously monitor several targets. However, more practically, the bridge's impulse response can be derived by monitoring the motion of a series of characteristic features for several days by deploying several cameras or several electro-optic devices 100.

The motion of n different targets can be monitored; where, $D_i, i=\{1, \ldots, n\}$, denotes the (measured) displacement of target i, $$D \begin{Bmatrix} D_1 \\ \vdots \\ D_n \end{Bmatrix}.$$

$W_j, j=\{1, \ldots, k\}$, denotes the load located at the location j on the bridge.

This is a linear problem, that is, there is a k×n matrix $$X \begin{pmatrix} X_{11} & \cdots & X_{1k} \\ \vdots & \vdots & \vdots \\ X_{n1} & \cdots & X_{nk} \end{pmatrix}$$

that relates D to W $$D\begin{Bmatrix}D_1\\ \vdots\\ D_n\end{Bmatrix} = X\begin{pmatrix}X_{11} & \cdots & X_{1k}\\ \vdots & \vdots & \vdots\\ X_{n1} & \cdots & X_{nk}\end{pmatrix} \cdot W\begin{Bmatrix}W_1\\ \vdots\\ W_k\end{Bmatrix}$$

Multiplying X with its transpose $X^T$ turns $X^TX$ into a square matrix.

$$X^TD = X^TXW$$

Which by multiplying with its inverse $(X^TX)^{-1}$ leads to find out $$W\begin{Bmatrix}W_1\\ \vdots\\ W_k\end{Bmatrix}$$

from $$D\begin{Bmatrix}D_1\\ \vdots\\ D_n\end{Bmatrix}$$

$$(X^TX)^{-1}X^TD = W$$

Defining the matrix X

In practice, the matrix X is the covariance matrix of the output $$D\begin{Bmatrix}D_1\\ \vdots\\ D_n\end{Bmatrix}$$

that is recorded over a long period of time.

$$X\begin{pmatrix}E[(D_1-\mu_1)(D_1-\mu_1)] & \cdots & E[(D_1-\mu_1)(D_n-\mu_n)]\\ \vdots & \vdots & \vdots\\ E[(D_n-\mu_n)(D_1-\mu_1)] & \cdots & E[(D_n-\mu_n)(D_n-\mu_n)]\end{pmatrix}$$

where the operator E denotes the expected (mean) value of its argument, and is the the expected value of the i-th entry in the vector D.

In one or more examples, to find out the elements of the "Green Function" (also called "Impulse Response") function matrix a whitening transformation is used if the crossing of vehicles over the bridge does not converge to a white process as the integration time increases.

6. Results

Figure 5:
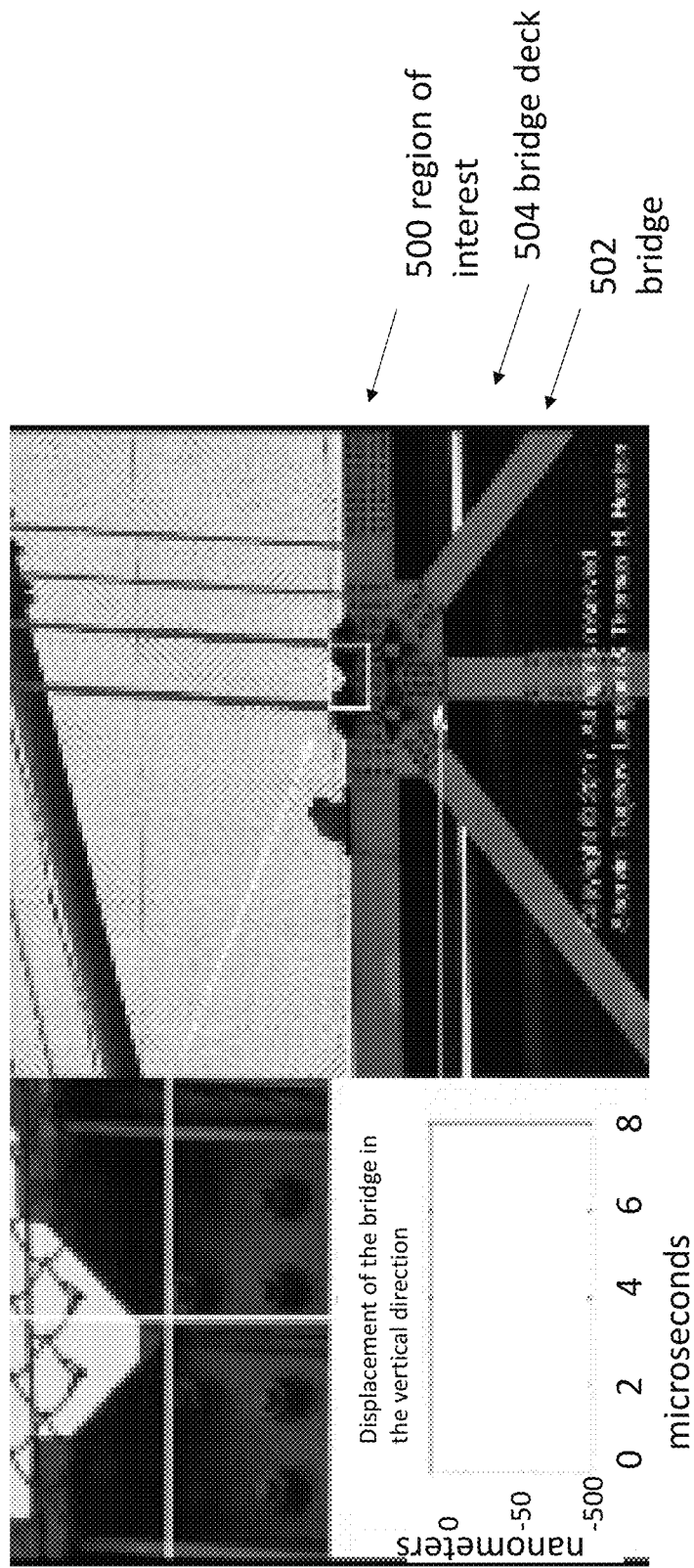
FIG. 5-7. Motion (e.g., deflection) measurements conducted on a bridge as truck traverse the bridge using an electro-optic device according to embodiments described herein.
Figure 6:
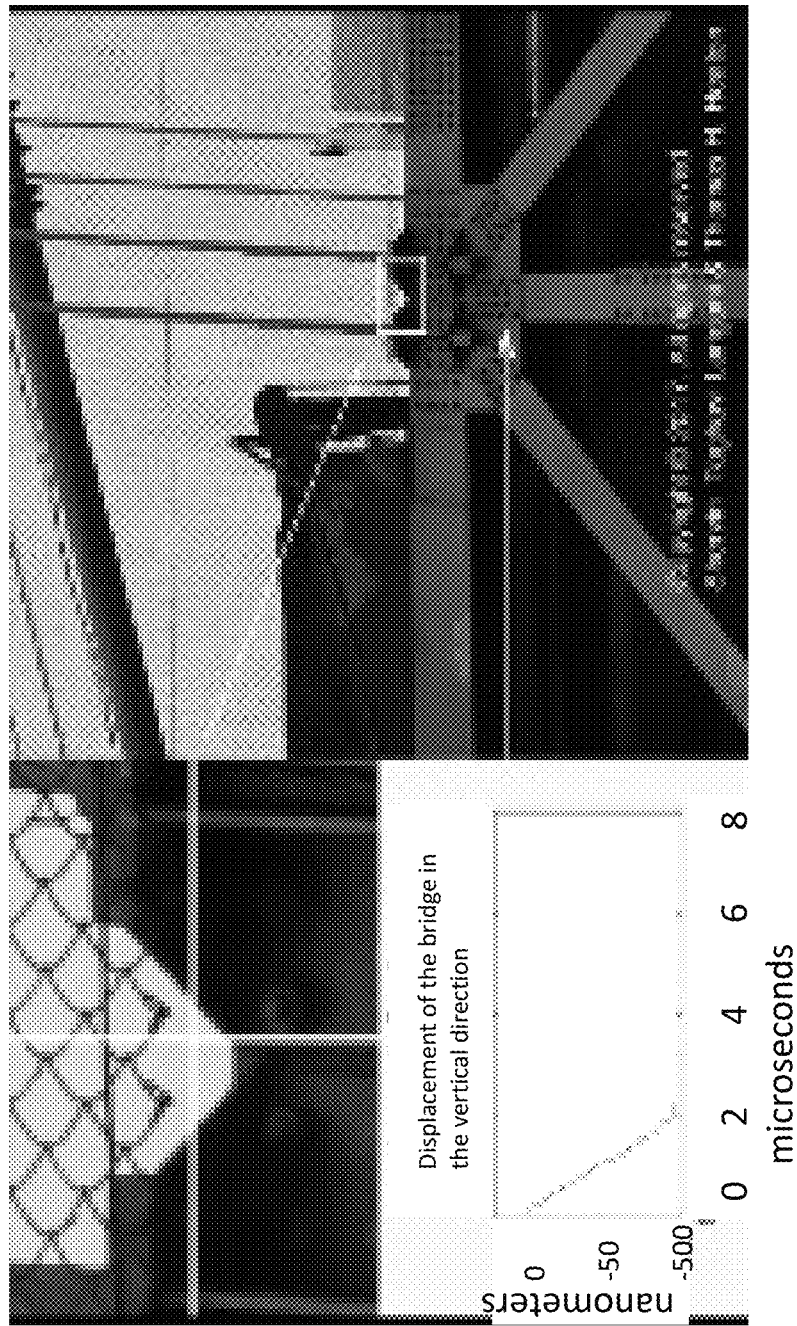
Figure 7:
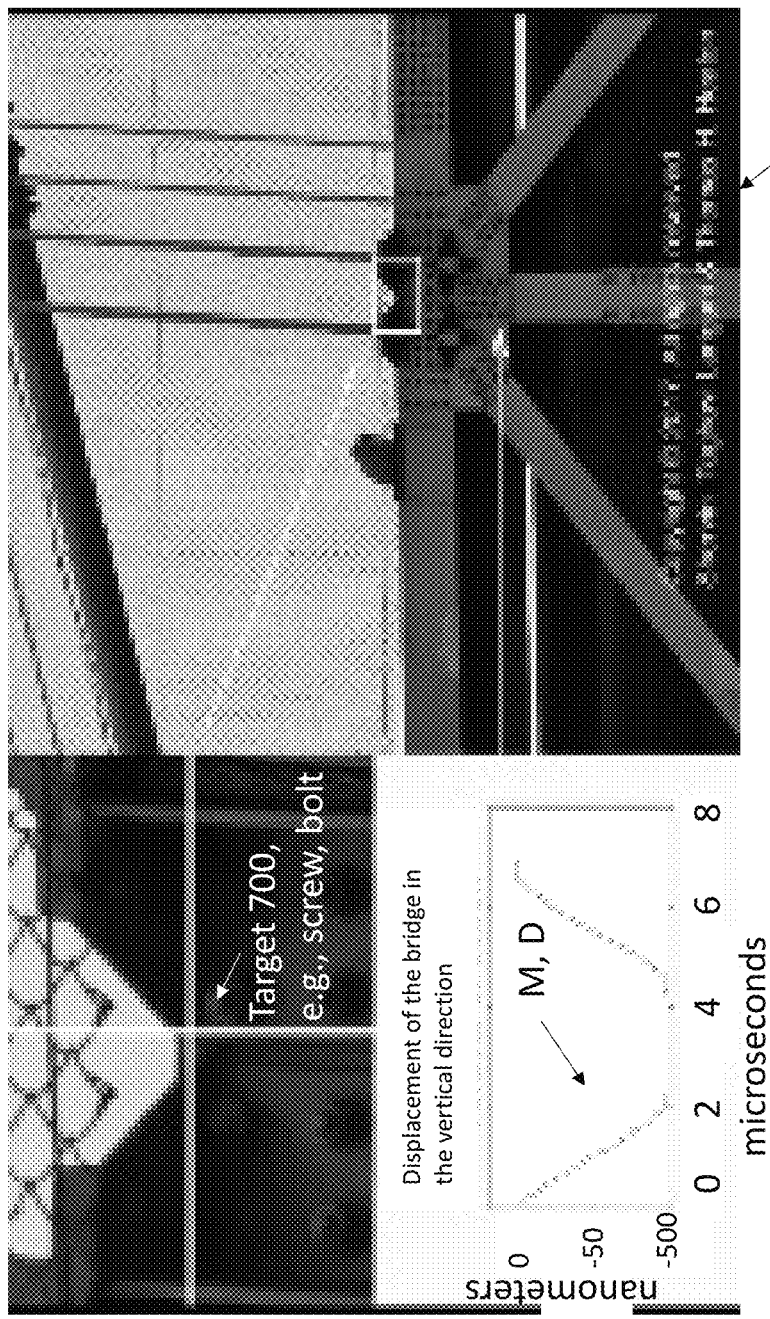

FIGS. 5-7 illustrate deflection measurements conducted on a bridge as truck traverse the bridge using an electro-optic device according to embodiments described herein 7. Process Steps a. Fabrication FIGS. 1-7 further illustrate an electro-optic device according to one or more examples and a method of making the same.

Block 200 represents providing or obtaining an imaging system (blocks referring to FIG. 2A).

Block 202 represents connecting or obtaining a sensor outputting signals in response to one or more images of an object imaged on the sensor using the imaging system.

Block 204 represents optionally connecting an analog amplifier to the sensor, the analog amplifier amplifying the signals using an analog process so as to form an analog output.

Block 206 represents optionally connecting an analog to digital converter (ADC) to the analog amplifier, the ADC converting the analog output into a digital data.

Block 208 further represents optionally connecting a demosaicing module to the ADC, the demosaicing module formatting the digital data into digital image data comprising the digital data associated with appropriate pixel positions on a display so that the digital image data can be used to construct the images of the object on the display.

Block 210 represents optionally connecting a video card comprising a graphics processing unit converting the digital image data into a time series of the images readable by a computer.

Block 212 represents connecting the computer, wherein the computer identifies a target in a time series of the images formed using the sensor.

Block 214 represents connecting a transmitter transmitting information comprising an identification of the target.

The end result is and electro-optic device, e.g. as illustrated in FIG. 1. The electro-optic device can be embodied in many ways including, but not limited to, the following.

1. An electro-optical device (100), comprising:
   an imaging system (104);
   a sensor (108) outputting signals in response to one or more images of an object or region of interest 500 (e.g., portion of a bridge 500, or side or deck 504 of a bridge for trucks, e.g., traversing a freeway or river) imaged on the sensor (108) using the imaging system (104);
   an analog amplifier (112)amplifier (112) connected to the sensor (100, 108), the analog amplifier (112)amplifier (112) amplifying the signals using an analog process so as to form an analog output;
   an analog to digital converter (ADC) connected to the analog amplifier (112)amplifier (112), the ADC converting the analog output into a digital data;
   a demosaicing module (114) connected to the ADC, the demosaicing module (114) formatting the digital data into digital image data comprising the digital data associated with appropriate pixel positions on a display (822) so that the digital image data can be used to construct the images of the object or the region of interest on the display (822);
   a video card (116) comprising a graphics processing unit (114) converting the digital image data into a time series of the images readable by a computer (118, 802);
   the computer (118, 802) connected to the video card (116), wherein the computer (118, 802) identifies a target 700 (e.g., individual bolts or any distinctive feature on the bridge deck) in the time series of the images; and
   a transmitter (120) transmitting information comprising an identification of the target.

2. The device of embodiment 1, wherein:
   the device does not include image stabilization or image stabilization is disabled, the image stabilization comprising software and/or hardware that reduces blurring of the images associated with the motion of the sensor (108); and
   the device does not include autofocus or the autofocus is disabled, the autofocus comprising software and/or hardware that automatically focuses the images of the object or the region of interest on the sensor (108).

3. An electro-optical device (100), comprising: an image sensor (108) outputting signals in response to a time series of images captured on the image sensor (108);
a computer (118, 802) connected to the image sensor (108) so as to receive the signals, wherein the images comprise a time series of image frames 702 indexed with an integer k and the computer (118, 802) identifies a target 700 inside the $k^{th}$ image frame 702 using an image of the target 700 in the $(k-1)^{th}$ image frame 702. In one or more examples k is an integer equal to at least 2, more than 2, at least 3, more than 3, at least 4, more than 4, at least 5, at least 10.

4. The device of embodiment 3, wherein the computer (118, 802) receives the signals from an HDMI (High-Definition Multimedia Interface) output or SDI (Serial Digital Interface) output of the demosaicing unit (114) of a camera comprising the image sensor (108), the device further including a video image capture card (116) comprising a graphics processing unit (114) converting digital image data outputted from the camera in response to the signals into the time series of the image frames 702 readable by the computer (118, 802).

5. The device of embodiment 3, further comprising:
an imaging system (104) connected to the image sensor (108), the sensor (108) outputting the signals in response to the time series of the images of an object or the region of interest imaged on the sensor (108) using the imaging system (104); 'a sensor (108) outputting signals in response to one or more images of the object or the region of interest imaged on the sensor (108) using the imaging system (104);
an analog amplifier (112) connected to the sensor (108), the analog amplifier (112)amplifier (112) amplifying the signals using an analog process so as to form an analog output;
an analog to digital converter (ADC) connected to the analog amplifier (112), the ADC converting the analog output into a digital data;
a demosaicing module (114) connected to the ADC, the demosaicing module (114) formatting the digital data into digital image data comprising the digital data associated with appropriate pixel positions on a display (822) so that the digital image data can be used to construct the images of the object or the region of interest on the display (822);
a video card (116) comprising a graphics processing unit (114) converting the digital image data into the time series of the image frames 702 readable by a computer (118, 802); and
the computer (118, 802) connected to the processor (804), wherein the computer (118, 802) identifies the target 700 in the time series of the image frames 702.

6. The device of embodiment 3, wherein:
the computer (118, 802) comprises a multi-core processor (804) including a plurality of processor (804) cores and the computer (118, 802) identifies the target 700 using a parallel process using the image of the target 700 in the $(k-1)^{th}$ image frame 702,
the parallel process is divided into smaller algorithm pieces that are each executed separately in one of the processor (804) cores,
the outputs of each of the processor (804) cores are combined and used to identify the target.

7. The device of embodiment 6, wherein:
the target 700 comprises a plurality of targets each captured in one of a plurality of $(k-1)^{th}$ image frames 702, the smaller algorithm pieces each identify one of the plurality of targets simultaneously and in real time with motion of each of the targets, in real-time.
the outputs of each of the processor (804) cores are combined and used to identify each of the targets so that a single one of the image sensor (108) is used to track the motions of each of the plurality of the targets.

8. The device of embodiment 3, wherein the computer (118, 802) correlates the $k^{th}$ image frame 702 with the image of the target 700 in the $(k-1)^{th}$ image frame 702 so as to determine a location of the target 700 in the $k^{th}$ image frame 702.

9. The device of embodiment 8, wherein the image frames 702 comprise images of a region of interest as a function of time, the device further comprising:
a plurality of lasers (122) physically connected to the image sensor (108) so that the lasers (122) are fixed relative to the image sensor (108), the lasers (122) each transmitting an electromagnetic beam to the region of interest so that images of the beams appear as spots in the image frames 702;
the computer (118, 802) associates certain motions of the beams identified in the image frames 702 with rotation of the image sensor (e.g., array of pixels), the certain motions comprising motions that are a function $K(L, \alpha, \theta_n)$ where $\alpha$ is an orientation angle of the image sensor (108), $\theta_n$ are the angles of orientation of each of then lasers (122) (n is an integer), and L is a distance between the image sensor and the region of interest (e.g., distance along or parallel to the optical axis of the image sensor); and
the computer (118, 802) determines the location of the target 700 taking into account the rotation of the image sensor (108).

10. The device of embodiment 9, wherein the computer (118, 802) disregards any displacement of the target 700 in the image frames 702 that are associated with the rotation of the image sensor (e.g., array).

11. The device of embodiment 10, wherein the computer (118, 802) determines the location as a function of time so as to measure a deflection D or motion M in the location of target 700 in response to a force applied to the target.

12. The system of embodiment 11, wherein the target 700 is located on a road or a bridge and the force is a weight of a vehicle traveling on the road or the bridge.

13. A system comprising:
a plurality of the devices of embodiment 3 or 8, each of the devices determining the location of a different target 700 in the images of one of a plurality of regions of interest as a function of time, each of the regions of interest on different areas of a structure; or
a single one of the devices of embodiment 2, wherein the device determines the location of a plurality of different targets in the images of one of a plurality of regions of interest as a function of time, each of the regions of interest on different areas of a structure; and
a processor (804) connected to the plurality of the devices or the single one of the devices, the processor (804) determining a force applied to the structure using the motions of each of the targets determined in each of the devices.

14. The system of embodiment 13, wherein the processor (804) uses the motion of the structure or the targets in combination with a speed (e.g., as determined from an additional video camera or traffic flow camera or otherwise) of a vehicle traveling on the bridge to determine the force comprising weight of the vehicle traveling on the structure comprising a road or a bridge.

15. The system of embodiment 14, wherein the processor (804) uses additional data comprising at least one vehicle characteristic including vehicle length/dimension, united states department of transportation number, and vehicle license plate so as to identify the vehicle.

16. The system of embodiment 14, wherein the system measuring the weight of the vehicle comprises the bridge in combination with the electro-optic device 100, e.g., wherein the bridge is the load cell on which the weight is applied and the load cell is used to measure the weight.

17. The system of embodiment 13, wherein the processor (804):
obtains a matrix D:

$$D \begin{Bmatrix} D_1 \\ \vdots \\ D_n \end{Bmatrix}$$

where $D_1 \ldots D_n$ are the deflections D or motions M of the targets obtained from each of the devices or the single device as a function of time;
determines a mean value $\mu_n$ for each of the deflections $D_1 \ldots D_n$,
determines a matrix X:

$$X \begin{pmatrix} E[(D_1-\mu_1)(D_1-\mu_1)] & \ldots & E[(D_1-\mu_1)(D_n-\mu_n)] \\ \vdots & \vdots & \vdots \\ E[(D_n-\mu_n)(D_1-\mu_1)] & \ldots & E[(D_n-\mu_n)(D_n-\mu_n)] \end{pmatrix}$$

where the operator E denotes the expected (mean) value of its argument; and
determines the force comprising a weight W of a vehicle traveling on the structure comprising a road or a bridge according to $(X^T X)^{-1} X^T D = W$.

18. The system of embodiment 13, further comprising a transmitter (120) transmitting the real-time deflections and the locations of the targets to the processor (804) using a cellular wireless network (904).

19. The system of embodiment 18, further comprising a cloud based server (5, 906) including the processor (804).

20. The system of embodiment 19, further comprising a power supply (124) powering the device so that the device is autonomously powered.

21. The system of embodiment 3, wherein the computer (118, 802) identifies or determines a location or motion of the target 700 even when a shape of the target 700 is changing during the measurement (e.g., so that tracking algorithm independent of shape). The k image frames may be taken sufficiently frequently so that the tracking algorithm is independent of shape.

22. The device of embodiment 9, further comprising an increased number of the lasers, greater than two, so that the computer uses the certain motions of the beams to measure a spatial rotation of the target relative to an inertial frame of reference in addition to measuring a rotation of the image sensor as well as displacement of the target along an optical axis of the image sensor (the range), because a number of independent equations (or measurements) exceeds the number of unknowns.

23. An electro-optic device, comprising:
a sensor (108) outputting signals in response to a time series of image frames 702 indexed with an integer k and captured on the sensor (e.g., array); the image frames comprising images of a region of interest;
a plurality of lasers (122) physically connected to the array so that the lasers (122) are fixed relative to the sensor, the lasers (122) each transmitting an electromagnetic beam to the region of interest so that images of the beams appear as spots in the image frames 702; and
a computer (118, 802) connected to the sensor so as to receive the signals, wherein:
the computer (118, 802) associates certain motions of the beams identified in the image frames 702 with rotation of the sensor, the certain motions comprising motions that are a function $K(L, \alpha, \theta_n)$ where $\alpha$ is an orientation angle of the sensor, $\theta_n$ are the angles of orientation of each of the n lasers (122) (n is an integer), and L is a distance between the sensor and the region of interest; and
the computer (118, 802) determines the location of the target 700 taking into account the rotation of the sensor.

24. The device of embodiment 23, further comprising an increased number of the lasers, greater than two, so that the computer uses the certain motions of the beams to measure a spatial rotation of the target relative to an inertial frame of reference in addition to measuring a rotation of the image sensor as well as displacement of the target along an optical axis of the image sensor (the range), because a number of independent equations (or measurements) exceeds the number of unknowns.

25. In one or more examples, the electro-optic system includes a camera streaming high rate uncompressed video-images data with no stabilization schemes into a computing unit for real-time processing. In one or more examples the electro-optic device transmits in real time the output data coming for the CMOS sensor into a separate lossless video-image capture card that generates and streams high-resolution digital format into an embedded computer.

26. In one or more examples, the electro-optic system weighs (e.g., vehicles) using a camera ("Weighcam").

b. Operation

FIG. 2 further illustrates a method of operating an electro-optic device, comprising imaging an object or target 700 using an imaging system; outputting signals in response to one or more images of an object imaged on the sensor using the imaging system; amplifying the signals using an analog amplifier using an analog process so as to form an analog output; using an ADC to convert the analog output into a digital data; formatting the digital data into digital image data comprising the digital data associated with appropriate pixel positions on a display so that the digital image data can be used to construct the images of the object on the display (e.g. using a demosaicing module); converting the digital image data into a time series of the images readable by a computer (e.g., using a video card); and using the computer to identify a target 700 in the time series of the images. In one or more examples, the images comprise a time series of image frames 702 indexed with an integer k and the computer identifies a target 700 inside the $k^{th}$ image frame 702 using an image of the target 700 in the $(k-1)^{th}$ image frame 702.

In one or more examples, the electro-optic system 100 deduces 1) the dynamic rotation of the camera; 2) the dynamic rotation of the target; 3) motion of the target along the range (optical axis of the camera) using a series of laser pointers.

In one or more examples using the electro-optic device to measure or detect vehicle weights, load cell scales, bending plate scale, or the sensor is the entire bridge. In one or more embodiments, the system described herein including the electro-optic device eliminates the errors that road and vehicle dynamics induce in weighing a vehicle while in motion because the variation of the road surface as a function of distance as well as the time-varying parameters of vehicle's suspension system and engine induced force is a zero-mean stationary random process over the length of a bridge. The net result is that our system eliminates the extra cost of flattening the pavement as required by AS™ 1318-09 standards for a Weigh-In-Motion system to work.

c. Hardware Environment

Figure 8:
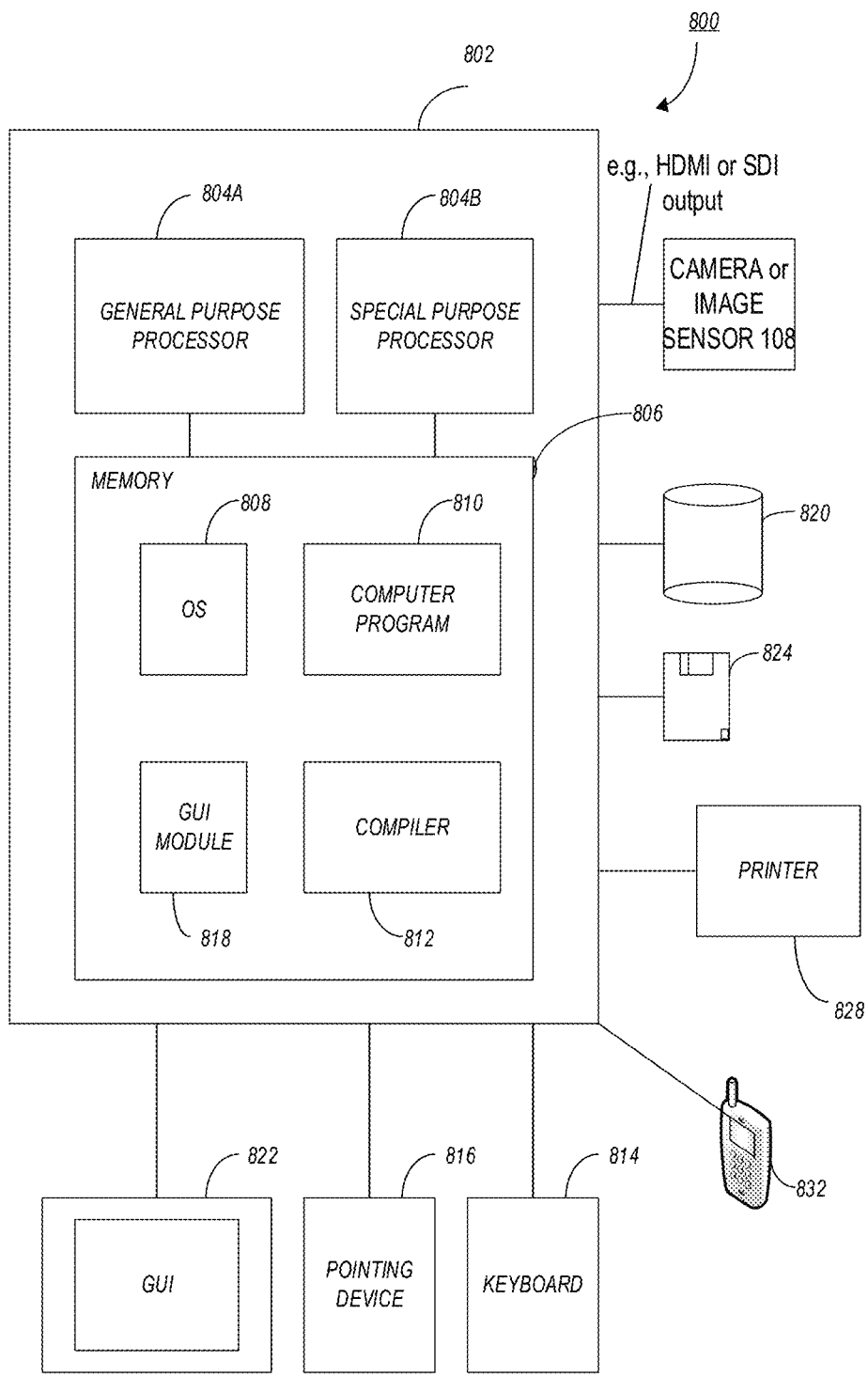
FIG. 8 Exemplary hardware environment used to implement various methods described herein.

FIG. 8 is an exemplary hardware and software environment 800 used to implement one or more embodiments of the processing or methods described herein, including but not limited to, processing elements needed to perform the tracking algorithm and other image processing functionalities described herein. The hardware and software environment includes a computer 802 and may include peripherals. Computer 802 may be a user/client computer, server computer, or may be a database computer. The computer 802 comprises a general purpose hardware processor 804A and/or a special purpose hardware processor 804B (hereinafter alternatively collectively referred to as processor 804) and a memory 806, such as random access memory (RAM). The computer 802 may be coupled to, and/or integrated with, other devices, including input/output (I/O) devices such as a keyboard 814, a cursor control device 816 (e.g., a mouse, a pointing device, pen and tablet, touch screen, multi-touch device, etc.) and a printer 828. In one or more embodiments, computer 802 may be coupled to, or may comprise, a portable or media viewing/listening device 832 (e.g., an MP3 player, iPod™, Iphone, Nook™, Ipad™, portable digital video player, cellular device, cell phone, smart phone, personal digital assistant, etc.). In yet another embodiment, the computer 802 may comprise a multi-touch device, mobile phone, gaming system, internet enabled television, television set top box, or other internet enabled device executing on various platforms and operating systems.

In one embodiment, the computer 802 operates by the general purpose processor 804A performing instructions defined by the computer program 810 under control of an operating system 808. The computer program 810 and/or the operating system 808 may be stored in the memory 806 and may interface with the user and/or other devices to accept input and commands and, based on such input and commands and the instructions defined by the computer program 810 and operating system 808, to provide output and results.

Output/results may be presented on the display 822 or provided to another device for presentation or further processing or action. In one embodiment, the display 822 comprises a liquid crystal display (LCD) having a plurality of separately addressable liquid crystals. Alternatively, the display 822 may comprise a light emitting diode (LED) display having clusters of red, green and blue diodes driven together to form full-color pixels. Each liquid crystal or pixel of the display 822 changes to an opaque or translucent state to form a part of the image on the display in response to the data or information generated by the processor 804 from the application of the instructions of the computer program 810 and/or operating system 808 to the input and commands. The image may be provided through a graphical user interface (GUI) module 818. Although the GUI module 818 is depicted as a separate module, the instructions performing the GUI functions can be resident or distributed in the operating system 808, the computer program 810, or implemented with special purpose memory and processors.

In one or more embodiments, the display 822 is integrated with/into the computer 802 and comprises a multi-touch device having a touch sensing surface (e.g., track pod or touch screen) with the ability to recognize the presence of two or more points of contact with the surface. Examples of multi-touch devices include mobile devices or smartphones (e.g., iPhone™, Nexus S™, Droid™ devices, etc.), tablet computers (e.g., iPad™ HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 802 according to the computer program 810 instructions may be implemented in a special purpose processor 804B. In this embodiment, the some or all of the computer program 810 instructions may be implemented via firmware instructions stored in a read only memory (ROM), a programmable read only memory (PROM) or flash memory within the special purpose processor 804B or in memory 806. The special purpose processor 804B may also be hardwired through circuit design to perform some or all of the operations to implement the present invention. Further, the special purpose processor 804B may be a hybrid processor, which includes dedicated circuitry for performing a subset of functions, and other circuits for performing more general functions such as responding to computer program 810 instructions.

In one embodiment, the special purpose processor 804B is an application specific integrated circuit (ASIC) or the computer can be a field programmable gate array (FPGA).

The computer 802 may also implement a compiler 812 that allows an application or computer program 810 written in a programming language such as COBOL, Pascal, C++, Python, FORTRAN, or other language to be translated into processor 804 readable code. Alternatively, the compiler 812 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 810 accesses and manipulates data accepted from I/O devices and stored in the memory 806 of the computer 802 using the relationships and logic that were generated using the compiler 812.

The computer 802 also optionally comprises an external communication device such as a modem, satellite link, Ethernet card, or other device for accepting input from, and providing output to, other computers 802.

In one embodiment, instructions implementing the operating system 808, the computer program 810, and the compiler 812 are tangibly embodied in a non-transient computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of computer program 810 instructions which, when accessed, read and executed by the computer 802, cause the computer 802 to perform the steps necessary to implement and/or use the present invention or to load the program of instructions into a memory 806, thus creating a special purpose data structure causing the computer 802 to operate as a specially programmed computer executing the method steps described herein. Computer program 810 and/or operating instructions may also be tangibly embodied in memory 806 and/or electro-optic system 100, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 802.

The processors 804a or 804b or computer may execute formatting the digital data into digital image data comprising the digital data associated with appropriate pixel positions on a display so that the digital image data can be used to construct the images of the object on the display (e.g. using a demosaicing module); converting the digital image data into a time series of the images readable by a computer (e.g., using a video card); and using the computer to identify a target 700 in the time series of the images. In one or more examples, the images comprise a time series of image frames 702 indexed with an integer k and the computer identifies a target 700 inside the $k^{th}$ image frame 702 using an image of the target 700 in the $(k-1)^{th}$ image frame 702.

Figure 9:
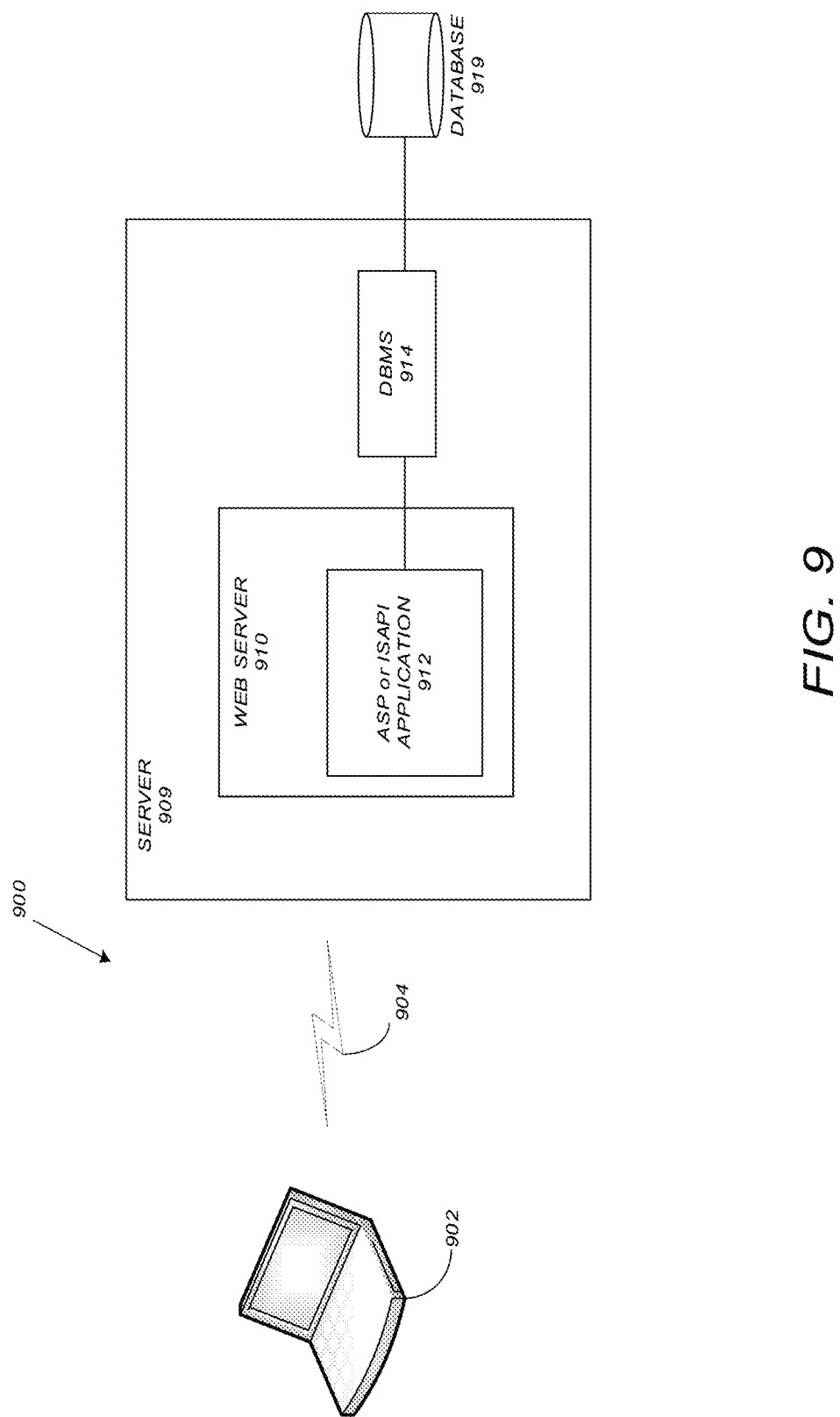
FIG. 9 Exemplary network environment used to implement various methods described herein.
Figure 10C:
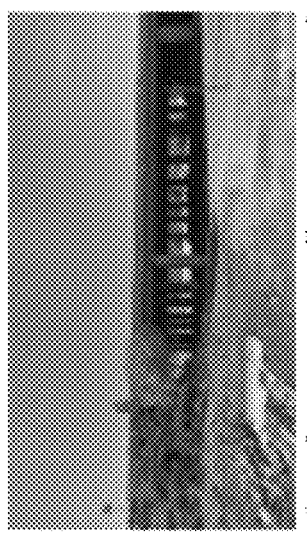
FIGS. 10A-10C illustrate different types of example bridges on which tests have been performed, wherein FIG.
Figure 10B:
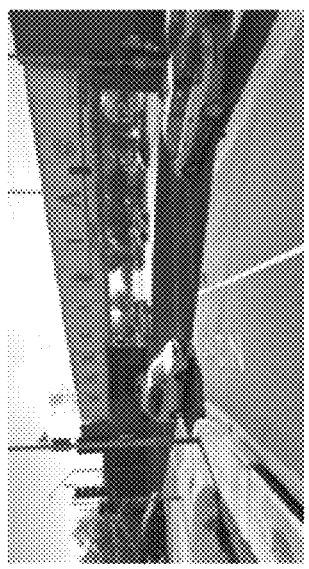
Figure 10A:
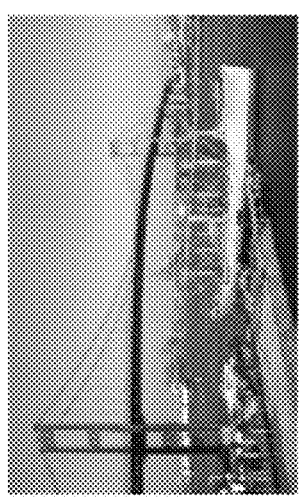

FIG. 9 schematically illustrates a typical distributed computer system 900 using a network 904 to connect client computers 902 to server computers 906. A typical combination of resources may include a network 904 comprising the Internet, LANs (local area networks), WANs (wide area networks), SNA (systems network architecture) networks, or the like, clients 902 that are personal computers or workstations (as set forth in FIG. 9), and servers 906 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 902 and servers 906 in accordance with embodiments of the invention.

A network 904 such as the Internet connects clients 902 to server computers 906. Network 904 may utilize ethernet, coaxial cable, wireless communications, radio frequency (RF), etc. to connect and provide the communication between clients 902 and servers 906. Clients 902 may execute a client application or web browser and communicate with server computers 906 executing web servers 910. Such a web browser is typically a program such as MICROSOFT INTERNET EXPLORER™, MOZILLA FIREFOX™, OPERA™, APPLE SAFARI™, etc. Further, the software executing on clients 902 may be downloaded from server computer 906 to client computers 902 and installed as a plug-in or ACTIVEX™ control of a web browser. Accordingly, clients 902 may utilize ACTIVEX™ components/component object model (COM) or distributed COM (DCOM) components to provide a user interface on a display of client 902. The web server 910 is typically a program such as MICROSOFT'S INTERNET INFORMATION SERVER™.

Web server 910 may host an Active Server Page (ASP) or Internet Server Application Programming Interface (ISAPI) application 912, which may be executing scripts. The scripts invoke objects that execute business logic (referred to as business objects). The business objects then manipulate data in database 916 through a database management system (DBMS) 914. Alternatively, database 916 may be part of, or connected directly to, client 902 instead of communicating/obtaining the information from database 916 across network 904. When a developer encapsulates the business functionality into objects, the system may be referred to as a component object model (COM) system. Accordingly, the scripts executing on web server 910 (and/or application 912) invoke COM objects that implement the business logic. Further, server 906 may utilize MICROSOFT' S™ Transaction Server (MTS) to access required data stored in database 916 via an interface such as ADO (Active Data Objects), OLE DB (Object Linking and Embedding DataBase), or ODBC (Open DataBase Connectivity).

Generally, these components 900-916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 902 and 906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 902 and 906.

The algorithms or processing performed using the method of FIG. 2 or the computer 118 can be performed in whole or in part on one or more computers (e.g., parallel processing in a client server relationship as illustrated in FIG. 9).

8. Advantages and Improvements

Weigh-in-Motion or Weighing-in-Motion (WIM) systems measure vehicle weights as they drive over a measurement site embedded in the highway and make the weighing process more efficient. Unlike static scales, WIM systems are capable of measuring vehicles traveling at a reduced or normal traffic speed and do not require the vehicle to come to a stop. A Weigh-In-Motion measurement site consists of either load cell scales, bending plate scale, or piezoelectric sensors embedded inside the pavement of the road. Those sensors deduce the weights of trucks as they pass over. A Weigh-In-Motion system has a measurement error due to the dynamic effects of weighing a vehicle at high speeds in addition to the error in the measuring device which is also present in a static scale. As a vehicle travels, the dynamic load applied to the road varies significantly due to the vehicle bouncing and shifting of the load distribution through the suspension system. While the actual weighing element of a piezoelectric sensor is measured in fractions of an inch, a Single Load Cell scale is active over approximately three feet. The longer period of analysis will yield a greater section of the loading curve. To mitigate the challenges associated with the nature of the measurement, AS™ 1318-09 standards have been created, which require that the height of the pavement do not change more than 3 mm over a distance of 5 meters anywhere for 60 meters before the WIM Scale to 30 meters past the scale [1]. This requirement is extremely hard to achieve and requires very high civil cost that makes the Total Cost of Ownership of a WIM system high [1, 2].

In embodiments of the system presented herein, on the other hand, the contact area is the entire span of the bridge that trucks cross. The variation of the road surface as a function of distance is a zero-mean stationary random process over the length of a bridge. Similarly the time varying parameters of vehicle's suspension system and engine induced force are zero-mean stationary random process over the time that it takes a vehicle to cross any bridge and will induce errors in the weight measurement obtained using conventional weigh in motion load cells that measure weight by measure deflections of a small plate in response to a force exerted on the plate. The system presented herein, on the other hand includes the entire bridge as part of the sensing apparatus, so that deflections caused by surface roughness across the bridge or time varying parameters of the vehicle suspension that depend on the vehicle speed and trajectory are canceled out. Thus, embodiments of the system described herein detects consistently clear deflections of bridge decks as vehicles cross (as shown in FIGS. 5-7) independently of the conditions of the road and the vehicle.

REFERENCES

The following references are incorporated by reference herein.
[1] S. Wimsett, Standard Specification for Highway Weigh-In-Motion (WIM)
Systems with User Requirements and Test Methods, West Conshohocken, United States: ASTM International, 2016.
[2] R. Bushman and A. J. Pratt, "Weigh In Motion Technology—Technology-Economics and Performance," in *North American Travel Monitoring Exhibition and Conference*, 1998.
[3] https://shop.usa.canon.com
[4] https://www.blackmagicdesign.com/products/blackmagicmicrostudiocamera4k
[5] Website accessible at http://resolver.caltech.edu/CaltechAUTHORS:20160726-154041262 REPORT NO. EERL 2016-01, CHARACTERIZING DEFORMATION OF BUILDINGS FROM VIDEOS by Shervin Taghavi Larigani and Thomas H. Heaton.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An electro-optical system, comprising:
a camera outputting digital image data in response to a time series of images captured by the camera;
a graphics processing unit converting the digital image data into image data representing a time series of image frames readable by a computer;
the computer connected to the graphics processing unit so as to receive the image data representing the time series of image frames indexed with an integer k, wherein:
the computer calculates, from a differential measurement between the image data representing the image frames, one or more motions comprising one or more displacements of one or more targets fixed on an object comprising a civil structure in response to, and in real time with, one or more forces applied to the object, wherein:
one or more of the targets are identified in the image data of the time series of image frames and with a rate enabling the differential measurement of the one or more displacements of the targets independent of distortion of shape of the one or more of the targets when the object moves under the one or more forces so as to decrease any errors in a calculation of the motions caused by the distortion; and
the computer calculates the forces from the one or more motions; and,
further comprising a traffic camera, wherein the computer determines the forces resulting from point loads traversing the civil structure comprising a bridge using an impulse response function of the civil structure relating the displacements to the forces according to a matrix equation, wherein a deformation of the bridge is a linear function of the forces applied by a plurality of vehicles traversing the bridge as well as their locations on the civil structure as determined from the traffic camera, and wherein the impulse response function and the forces are determined with a dynamic resolution commensurate with the displacements being measured from the image data comprising uncompressed image data.

2. The system of claim 1, further comprising:
an electro-optic device comprising:
the camera, the camera further including an imaging system connected to an image sensor, the image sensor outputting signals in response to the time series of the images of the object or one or more regions of interest of the object imaged on the image sensor using the imaging system;
an analog amplifier connected to the image sensor, the analog amplifier amplifying the signals using an analog process so as to form an analog output;
an analog to digital converter (ADC) connected to the analog amplifier, the ADC converting the analog output into a digital data; and
a demosaicing module connected to the ADC, the demosaicing module formatting the digital data into the digital image data comprising the digital data associated with appropriate pixel positions on a display so that the digital image data can be used to construct the images of the object or the region of interest on the display; and wherein:
the electro-optical system does not include image stabilization or image stabilization is disabled, the image stabilization comprising at least software or hardware that reduces blurring of the images associated with motion of the sensor;
the electro-optical system does not include autofocus or the autofocus is disabled, the autofocus comprising at least one of software or hardware that automatically focuses the images of the object or the one or more regions of interest on the sensor; and
the image data comprises uncompressed digital image data.

3. The system of claim 2, further comprising a distributed computer system including the computer comprising an embedded computer and a server coupled to the embedded computer in the electro-optic device, wherein the embedded computer comprises a multi-core processor and the distributed computer system enables real time viewing and archiving of the tracking of the one or more targets.

4. The system of claim 1, wherein the computer comprising multiple processing cores calculates the displacement using a parallel process and using the digital image data comprising the uncompressed digital image data and obtained without a stabilization scheme.

5. The system of claim 1, wherein the one or more targets are located on the object comprising the civil structure comprising a road on the bridge and the forces comprise a weight of one of the vehicles traveling on the bridge.

6. The system of claim 1, wherein the computer uses the one or more motions of the one or more targets in combination with the one of the locations of one of the vehicles traveling on the object comprising the civil structure comprising the bridge to determine the forces comprising a weight or a point load of the one of the vehicles traveling on the bridge.

7. The system of claim 6, wherein the computer uses additional data comprising at least one vehicle characteristic including vehicle dimension, united states department of transportation number, and vehicle license plate obtained in real-time using live traffic video, so as to identify the one of the vehicles and output the weight in real-time with the motions.

8. The system of claim 1, further comprising a transmitter transmitting at least one of the digital image data, the motions, or the locations of the one or more targets to the computer using a cellular wireless network.

9. The system of claim 8, further comprising a cloud based server including the computer.

10. The system of claim 1, wherein the computer calculates the motions using an algorithm that is invariant to a global brightness change caused by exposure and luminosity variation conditions while capturing the time series of images using the camera.

11. The system of claim 1, wherein:
the computer processes traffic video in real-time to determine a vehicle location of one of the vehicles traversing the bridge, and combines the vehicle location with the one or more motions so as to deduce a weight of the one of the vehicles traversing the bridge.

12. The system of claim 1, wherein the object comprises the civil structure comprising an overpass.

13. The system of claim 1, wherein the image frames are streamed to the computer in the real time without any loss of information relevant to identifying the targets and determining the motions independent of rotation of the targets and changes in shape of the one or more targets.

14. An electro-optical system, comprising:
a camera outputting digital image data in response to a time series of images of one or more targets fixed on a civil structure;
a graphics processing unit for converting the digital image data into image data representing a time series of image frames readable by a computer;
the computer connected to the graphics processing unit so as to receive the image data representing the time series of image frames indexed with an integer k, wherein interfaces between the camera and the graphics processing unit and between the graphics processing unit and the computer are such that the image data comprises uncompressed image data and:
the computer, comprising multiple processing cores using a parallel computing process:
identifies the one or more targets in the image data of the $k^{th}$ image frame and the $(k-1)^{th}$ image frame in real-time with motions of the targets in response to one or more forces applied to the civil structure, and
calculates the motions in the real time with the forces from a change in positioning of the one or more targets between the image data of the $k^{th}$ image frame and the $(k-1)^{th}$ image frame; and
the computer calculates the one or more forces from the one or more motions; and
wherein the computer determines the forces resulting from point loads traversing the civil structure comprising a bridge using an impulse response function of the civil structure relating displacements of the one or more targets to the forces according to a matrix equation, wherein a deformation of the bridge is a linear function of the forces applied by a plurality of vehicles traversing the bridge as well as their locations on the civil structure as determined from a traffic camera, and wherein the impulse response function and the forces are determined with a dynamic resolution commensurate with the displacements being measured from the image data comprising uncompressed image data.

15. The system of claim 14, wherein camera comprises an image sensor and the image frames comprise images of a region of interest of the object as a function of time, the system further comprising:
a plurality of lasers physically connected to the image sensor so that the lasers are fixed relative to the image sensor, the lasers each transmitting an electromagnetic beam to the region of interest so that images of the beams appear as spots in the image frames;
the computer associates certain motions of the beams identified in the image frames with rotation of the image sensor, the certain motions comprising motions that are a function K ($L$, $\alpha$, $\theta_n$) where a is an orientation angle of the image sensor, $\theta_n$ are the angles of orientation of each of the n lasers (n is an integer), and L is a distance between the image sensor and the region of interest along an optical axis of the image sensor; and
the computer determines the one or more locations of the targets taking into account the rotation of the image sensor.

16. The system of claim 15, wherein the computer disregards any displacement of the targets in the image frames that are associated with the rotation of the image sensor.

17. The system of claim 14, wherein the computer is embedded with or physically connected to the camera.

18. The system of claim 14, wherein the computer identifies the targets using an image template matching technique as the image data comprising the uncompressed image data is received in the computer in real time with the motions and prior to the image data being assembled into a video.

19. The system of claim 14, further comprising one of the interfaces interface comprising a High-Definition Multimedia Interface (HDMI) output or Serial Digital Interface (SDI) connecting the camera to the graphics processing unit so that the image data comprises the uncompressed image data.

20. A method of fabricating an electro-optical system, comprising:
providing a camera comprising:
an image sensor outputting signals in response to the time series of the images of an object or a region of interest imaged on the sensor;

an analog amplifier connected to the sensor, the analog amplifier amplifying the signals using an analog process so as to form an analog output;

an analog to digital converter (ADC) connected to the analog amplifier, the ADC converting the analog output into a digital data; and a demosaicing module connected to the ADC, the demosaicing module formatting the digital data into the uncompressed digital video image data comprising the digital data associated with appropriate pixel positions on a display so that the uncompressed digital video image data can be used to construct the images of the object or the region of interest on the display; and a High-Definition Multimedia Interface (HDMI) output or Serial Digital Interface (SDI) outputting the uncompressed digital video-image data in response to the time series of the images captured by the camera;

connecting a graphics processing unit converting the uncompressed digital video-image data into a time series of image frames readable by a computer, the graphics processing unit receiving the digital video-image data from the HDMI output or the SDI output; and connecting the computer to the graphics processing unit so as to receive the time series of image frames indexed with an integer k, wherein the computer monitors one or more motions of a plurality of targets identified inside the $k^{th}$ image frame using an image of the targets in the $(k-1)^{th}$ image frame; and wherein:

the computer comprises a multi-core processor including a plurality of processor cores executing a parallel process so as to monitor the motions of the targets in real time;

the parallel process is divided into smaller algorithm pieces that are each executed separately in the multi-core processor, the smaller algorithm pieces each identify one of the plurality of targets simultaneously and in real time with the one or more motions, and the outputs of each of the processor cores are combined so that the camera is used to track the motions of each of the plurality of the targets;

providing one or more processors:

processing traffic video to determine a vehicle location of a vehicle traversing the object comprising a civil structure, and combining the vehicle location with the motions of the targets on the civil structure so as to deduce, from the motions, a weight of one of the vehicles traversing the civil structure; and wherein the computer determines the forces resulting from point loads traversing the civil structure comprising a bridge using an impulse response function of the civil structure relating the displacements of the targets to the forces according to a matrix equation, wherein a deformation of the bridge is a linear function of the forces applied by a plurality of vehicles traversing the bridge as well as their locations on the civil structure as determined from the traffic video, and wherein the impulse response function and the forces are determined with a dynamic resolution commensurate with the displacements being measured from the image data comprising uncompressed image data.

21. An electro-optical system, comprising:

a camera outputting digital image data in response to a time series of images captured by the camera;

a graphics processing unit converting the digital image data into image data representing a time series of image frames readable by a computer;

the computer connected to the graphics processing unit so as to receive the image data representing the time series of image frames indexed with an integer k, wherein:

the computer calculates, from a differential measurement between the image data representing the image frames, one or more motions comprising one or more displacements of one or more targets fixed on a civil structure in response to, and in real time with, one or more forces applied to the civil structure, wherein:

one or more of the targets are identified in the image data of the time series of image frames and with a rate enabling the differential measurement of the one or more displacements of the targets independent of distortion of shape of the one or more of the targets when the object moves under the one or more forces so as to decrease any errors in a calculation of the motions caused by the distortion; and the computer calculates the forces from the one or more motions; and, the computer determines the forces resulting from point loads traversing the civil structure comprising a bridge using an impulse response function of the civil structure relating the displacements to the forces according to a matrix equation, wherein a deformation of the bridge is a linear function of the forces applied by one or more vehicles traversing the bridge as well as locations of the one or more vehicles on the civil structure as determined from a traffic camera, and wherein the impulse response function and the forces are determined with a dynamic resolution commensurate with the displacements being measured from the image data comprising uncompressed image data.

22. The system of claim 1, further comprising the computer tracking the motions in real time using a parallel computing process and the digital image data comprising the uncompressed digital image data obtained without using a stabilization scheme.

* * * * *